US010996929B2

(12) United States Patent
Najafi et al.

(10) Patent No.: US 10,996,929 B2
(45) Date of Patent: May 4, 2021

(54) HIGH QUALITY DOWN-SAMPLING FOR DETERMINISTIC BIT-STREAM COMPUTING

(71) Applicant: Regents of the University of Minnesota, Minneapolis, MN (US)

(72) Inventors: Mohammadhassan Najafi, Lafayette, LA (US); David J. Lilja, Maplewood, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 131 days.

(21) Appl. No.: 16/352,933

(22) Filed: Mar. 14, 2019

(65) Prior Publication Data
US 2019/0289345 A1    Sep. 19, 2019

Related U.S. Application Data

(60) Provisional application No. 62/643,369, filed on Mar. 15, 2018.

(51) Int. Cl.
*G06F 7/70* (2006.01)
*G06F 7/58* (2006.01)

(52) U.S. Cl.
CPC .............. *G06F 7/70* (2013.01); *G06F 7/584* (2013.01)

(58) Field of Classification Search
CPC .................... G06F 7/58–586; G06N 3/0472
See application file for complete search history.

(56) References Cited

U.S. PATENT DOCUMENTS

| 5,412,587 A | 5/1995 | Holt et al. |
| 6,745,219 B1 * | 6/2004 | Zelkin ............... G06N 7/005 708/490 |
| 7,095,439 B2 | 8/2006 | Hammadou |
| 7,424,500 B2 | 9/2008 | Fukushima et al. |

(Continued)

FOREIGN PATENT DOCUMENTS

CN    104615406    5/2013

OTHER PUBLICATIONS

J. H. Anderson, Y. Hara-Azumi and S. Yamashita, "Effect of LFSR seeding, scrambling and feedback polynomial on stochastic computing accuracy," 2016 Design, Automation & Test in Europe Conference & Exhibition (DATE), 2016, pp. 1550-1555 (Year: 2016).*

(Continued)

*Primary Examiner* — Matthew D Sandifer
(74) *Attorney, Agent, or Firm* — Shumaker & Sieffert, P.A.

(57) ABSTRACT

This disclosure describes techniques for processing data bits using pseudo-random deterministic bit-streams. In some examples, a device includes a pseudo-random bit-stream generator configured to generate bit combinations encoding first and second numerical values based on a proportion of the data bits in the sequence that are high relative to the total data bits in the sequence. The device also includes a stochastic computational unit configured to perform a computational operation on the bit combinations and produce an output bit-stream having a set of data bits indicating a result of the computational operation, wherein the data bits of the output bit-stream represent the result based on a probability that any data bit in the set of data bits of the output bit-stream is high.

20 Claims, 12 Drawing Sheets

(56) References Cited

U.S. PATENT DOCUMENTS

| | | | |
|---|---|---|---|
| 7,634,749 | B1 | 12/2009 | Cortadella et al. |
| 8,645,286 | B2 | 2/2014 | Jonas et al. |
| 9,646,243 | B1 | 5/2017 | Gokmen |
| 10,063,255 | B2 | 8/2018 | Riedel et al. |
| 2006/0155551 | A1 | 7/2006 | Ueda |
| 2007/0110300 | A1 | 5/2007 | Chang |
| 2008/0294970 | A1 | 11/2008 | Gross |
| 2009/0228238 | A1 | 9/2009 | Mansinghka et al. |
| 2011/0154150 | A1 | 6/2011 | Kang |
| 2011/0231731 | A1 | 9/2011 | Gross |
| 2013/0007551 | A1 | 1/2013 | Krishnan |
| 2013/0124164 | A1 | 5/2013 | Jha |
| 2014/0081899 | A1 | 3/2014 | Jonas et al. |
| 2017/0109628 | A1 | 4/2017 | Gokmen |
| 2017/0188174 | A1 | 6/2017 | Lee |
| 2017/0192752 | A1 | 7/2017 | Bradbury |
| 2017/0255225 | A1 | 9/2017 | Lilja et al. |
| 2017/0359082 | A1* | 12/2017 | Riedel ..................... H03M 7/26 |
| 2018/0196642 | A1 | 7/2018 | Droulez et al. |
| 2018/0204131 | A1 | 7/2018 | Najafi et al. |

OTHER PUBLICATIONS

Yamanaka et al., "A CMOS Stochastic Associative Processor Using PWM Chaotic Signals," IEICE Trans. Electron., vol. E84-C, No. 12, Dec. 2001, pp. 1723-1729.

Alaghi et al., "Fast and Accurate Computation using Stochastic Circuits," Design Automation and Test in Europe Conference and Exhibition, Mar. 24-28, 2014, IEEE online Apr. 21, 2014, 4 pp.

Alaghi et al., "Stochastic Circuits for Real-Time Image-Processing Applications," Proceedings of the 50th Annual Design Automation Conference, May 29-Jun. 7, 2013, 6 pp.

Alaghi et al., "Survey of Stochastic Computing," ACM Transactions on Embedded Computing Systems, vol. 12, No. 2s, Article 92, May 2013, 19 pp.

Alaghi et al., "Exploiting Correlation in Stochastic Circuit Design," Proc. IEEE 31st Int'l Conf. Computer Design, Oct. 2013, 8 pp.

Alaghi et al., "Trading Accuracy for Energy in Stochastic Circuit Design" J. Emerging Technologies in Computing Systems, vol. 13, No. 3, Apr. 2017, 30 pp.

Ardakani et al., "VLSI Implementation of Deep Neural Network Using Integral Stochastic Computing," IEEE Transactions on Very Large Scale Integration (VLSI) Systems, vol. 25, No. 10, Oct. 2017, pp. 2688-2699.

Brown et al., "Stochastic Neural Computation I: Computational Elements," IEEE Transactions on Computers, vol. 50, Issue 9, Sep. 2001, 15 pp.

Chapiro, "Globally-Asynchronous Locally-Synchronous Systems," Dissertation submitted to the Department of Computer Science, Report No. STAN-CS-84/1026, Stanford University, Oct. 1984, 138 pp.

Choi et al., A Magnetic Tunnel Junction Based True Random Number Generator with Conditional Perturb and Real-Time Output Probability Tracking, Electron Devices Meeting, Dec. 15-17, 2014, available from IEEE Feb. 23, 2015, 4 pp.

Cushon et al., "A Min-Sum Iterative Decoder Based on Pulsewidth Message Encoding," IEEE Transactions on Circuits and Systems-II: Express Briefs, vol. 57, No. 11, Nov. 2010, 5 pp.

Fick et al., "Mixed-Signal Stochastic Computation Demonstrated in an Image Sensor with Integrated 2D Edge Detection and Noise Filtering," Proc. IEEE Custom Integrated Circuits Conf. Nov. 2014, pp. 1-4.

Friedman, "Clock Distribution Networks in Synchronous Digital Integrated Circuits," IEEE, vol. 89, No. 5, May 2001, 28 pp.

Gaines, "Stochastic Computing Systems, Chapter 2," Advances in Information System Science, 1969, 69 pp. (Applicant points out, in accordance with MPEP 609.04(a), that the year of publication, 1969, is sufficiently earlier than the effective U.S. filing date, so that the particular month of publication is not in issue.).

Golomb et al. "Signal Design for Good Correlation: For Wireless Communication, Cryptography, and Radar," 'Chapter 4, Feedback Shift Register Sequences,' published Jul. 11, 2005, pp. 81-116.

Golomb et al., "Signal Design for Good Correlation: For Wireless Communication, Cryptography, and Radar," 'Chapter 5, Randomness Measurements and $m$-Sequences,' published Jul. 11, 2005, pp. 117-161.

Hayes, "Introduction to Stochastic Computing and Its Challenges," Proc. 52nd ACM/EDAC/IEEE Design Automation Conf. Jun. 2015, p. 1-3.

Ichihara et al., "Compact and Accurate Stochastic Circuits with Shared Random Number Sources," In Computer Design (ICCD), 2014 32nd IEEE International Conference, Oct. 2014, pp. 361-366.

International Technology Roadmap for Semiconductors 2.0, 2015, accessed on May 21, 2015 from www.itrs2.net/itrs-reports.html, 78 pp.

Jenson et al., "A Deterministic Approach to Stochastic Computation," presentation acceptance at the International Workshop on Logic and Synthesis, Nov. 10, 2016, 8 pp.

Jenson et al., "A Deterministic Approach to Stochastic Computation," submitted to the 2016 International Conference on Computer Aided Design, Jun. 10, 2016, 8 pp.

Jiang et al., "Design of Mixed Synchronous/Asynchronous Systems with Multiple Clocks," IEEE Transactions on Parallel and Distributed Systems, vol. 26, No. 8, Aug. 2015, 13 pp.

Jonas, Eric Michael. "Stochastic architectures for probabilistic computation." PhD diss., Massachusetts Institute of Technology, Feb. 2014. (Year: 2014) 112 pp.

Kim et al., "Dynamic Energy-Accuracy Trade-off Using Stochastic Computing in Deep Neural Networks," in Proceedings of the 53rd Annual Design Automation Conference, DAC '16, Jun. 2016, 6 pp.

Koopman, "Maximal Length LFSR Feedback Terms," accessed from https://users.ece.cmu.edu/Koopman/lfsr/index.html, Jun. 4, 2018, 3 pp.

Lee et al., "Energy-Efficient Hybrid Stochastic-Binary Neural Networks for Near-Sensor Computing," DATE'17 Proceedings of the Conference on Design, Automation & Test in Europe, Mar. 2017, 6 pp.

Li et al., "A Low Power Fault-Tolerance Architecture for the Kernel Density Estimation Based Image Segmentation Algorithm," International Conference on Application Specific Systems, Architectures and Processors, Sep. 11-14, 2011, available from IEEE Oct. 13, 2011, 8 pp.

Li et al., "A Stochastic Digital Implementation of a Neural Network Controller for Small Wind Turbine Systems," IEEE Transactions on Power Electronics, vol. 21, No. 5, Sep. 2006, 6 pp.

Li et al., "A Stochastic Reconfigurable Architecture for Fault-Tolerant Computation with Sequential Logic," 30th International Conference on Computer Design, IEEE, Sep. 30-Oct. 3, 2012, 6 pp.

Li et al., "An FPGA Implementation of a Restricted Boltzmann Machine Classifier Using Stochastic Bit Streams," Sep. 10, 2015, 2 pp.

Li et al., "Computation on Stochastic Bit Streams Digital Image Processing Case Studies," IEEE Transactions on Very Large Scale Integration (VLSI) Systems, vol. 22, Issue 3, Mar. 2014, available from IEEE Apr. 15, 2013, 14 pp.

Li et al., "Logical Computation on Stochastic Bit Streams with Linear Finite-State Machines," IEEE Transactions on Computers, vol. 63, No. 6, Jun. 2014, 13 pp.

Li et al., "Neural Network Classifiers using Stochastic Computing with a Hardware-Oriented Approximate Activation Function," 2017 $35^{th}$ IEEE International Conference on Computer Design (ICCD), Nov. 2017, 8 pp.

Li et al., "The Synthesis of Complex Arithmetic Computation on Stochastic Bit Streams Using Sequential Logic," International Conference on Computer-Aided Design, Nov. 2012, 8 pp.

Li et al., "Using Stochastic Computing to Reduce the Hardware Requirements for a Restricted Boltzmann Machine Classifier," In Proceedings of the 2016 ACM/SIGDA International Symposium on Field-Programmable Gate Arrays, FPGA '16, Feb. 2016, pp. 36-41.

Liang et al., "Stochastic Modeling and Optimization in a Microgrid: A Survey," Energies, vol. 7, Mar. 31, 2014, 24 pp.

(56) References Cited

OTHER PUBLICATIONS

Liu et al., Architectures for Recursive Digital Filters Using Stochastic Computing, IEEE Transactions on Signal Processing, vol. 64, No. 14, Jul. 2016, pp. 3705-3718.
Mansinghka et al., "Stochastic Digital Circuits for Probabilistic Inference," Computer Science and Artificial Intelligence Laboratory Technical Report, Massachusetts Institute of Technology, Nov. 23, 2008, 12 pp.
Mansinghka, Vikash Kumar. "Natively Probabilistic Computation." PhD diss., Massachusetts Institute of Technology, Department of Brain and Cognitive Sciences, Jun. 2009, (Year: 2009) 136 pp.
Murmann, "ADC Performance Survey 1997-2015," [online], accessed on May 21, 2005, available http://web.stanford.edu/murmann/adcsurvey.html, 2015, 58 pp.
Naderi et al., "Delayed Stochastic Decoding of LDPC Codes," Transactions on Signal Processing, vol. 59, No. 11, IEEE, Nov. 2011, 10 pp.
Najafi et al., "A Fast Fault-Tolerant Architecture for Sauvola Local Image Thresholding Algorithm Using Stochastic Computing," IEEE Transactions on Very Large Scale Integration (VLSI) Systems, vol. 24. No. 2, IEEE, Feb. 2016, 5 pp.
Najafi et al., "A Reconfigurable Architecture with Sequential Logic-Based Stochastic Computing" ACM J. Emerging Technologies in Computing Systems, vol. 13, No. 4, Jun. 2017, 28 pp.
Najafi et al., "An Overview of Time-Based Computing with Stochastic Constructs," Ultra-Low- Power Processors, IEEE Computer Society, Nov./Dec. 2017, pp. 62-71.
Najafi et al., "High Quality Down-Sampling for Deterministic Approaches to Stochastic Computing," IEEE Transactions on Emerging Topics in Computing, Dec. 2017, 7 pp.
Najafi et al., "High-Speed Stochastic Circuits Using Synchronous Analog Pulses," Proc. 22nd Asia and South Pacific Design Automation Conference, Feb. 2017, pp. 481-487.
Najafi et al., "Polysynchrotis Clocking: Exploiting the Skew Tolerance of Stochastic Circuits," IEEE Transactions on Computers, vol. PP, Issue 99, Apr. 25, 2017, 11 pp.
Najafi et al., "Polysynchronous Clocking: Exploiting the Skew Tolerance of Stochastic Circuits," IEEE Transactions on Computers, vol. 66, No. 10, Oct. 2017, 13 pp.
Najafi et al., "Poly-synchronous Stochastic Circuits," 2016 21st Asia and South Pacific Design Automation Conference (ASP-DAC), Jan. 25-28, 2016, IEEE online Mar. 10, 2016, 7 pp.
Najafi et al., "Power and Area Efficient Sorting Networks using Unary Processing," 2017 IEEE 35th International Conference on Computer Design, Nov. 2017, pp. 125-128.
Najafi et al., "Time-Encoded Values for Highly Efficient Stochastic Circuits," IEEE Transactions on Very Large Scale Integration (VLSI) Systems, vol. 25, No. 5, May 2017, pp. 1644-1657.
Onizawa et al., "Analog-to-Stochastic Converter Using Magnetic Tunnel Junction Devices for Vision Chips," IEEE Transactions on Nanotechnology, vol. 15, No. 5, Sep. 2016, pp. 705-714.
Pasca, "Neural Network Digital Hardware Implementation," M.A. Sc. diss., Ottawa-Carleton Institute for Electrical and Computer Engineering-School of Information Technology and Engineering, Dec. 2006, 158 pp.
Poppelbaum et al. "Stochastic computing elements and systems," AFIPS Fall Joint Computer Conference, Nov. 1967, pp. 635-644.
Qian, "Digital yet Deliberately Random: Synthesizing Logical Computation on Stochastic Bit Streams," Dissertation from the University of Minnesota, Jul. 2011, 185 pp.
Qian et al., "An Architecture for Fault-Tolerant Computation with Stochastic Logic," IEEE Transactions on Computers, vol. 60, Issue 1, Jan. 2011, 13 pp.
Qian et al., "Synthesizing Logical Computation on Stochastic Bit Streams," Proceedings of IEEE, 2011, (Applicant points out, in accordance with MPEP 609.04(a), that the year of publication 2011, is sufficiently earlier than the effective U.S. filing date, so that the particular month of publication is not in issue.) 8 pp.
Qian et al., "The Synthesis of Robust Polynomial Arithmetic with Stochastic Logic," 2008 45th ACM/IEEE Design Automation Conference, Jun. 8-13, 2008, 6 pp.
Qian et al., "The Synthesis of Stochastic Circuits for Nanoscale Computation: Chapter 18," International Journal of Nanotechnotogy and Molecular Computation, Oct.-Dec. 2009, 16 pp.
Ranjbar et al., "Using Stochastic Architectures for Edge Detection Algorithms," 2015 23rd Iranian Conference on Electrical Engineering (ICEE), May 10-14, 2015, available from IEEE Jul. 2, 2015, 6 pp.
Riedel, "Polysynchronous Clocking for Molecular Computing," MBMC Workshop, Dec. 4, 2015, 37 pp.
Roberts et al., "A Brief Introduction to Time-to-Digital and Digital-to-Time Converters," IEEE Transactions on Circuits and Systems-II: Express Briefs, vol. 57, No. 3, Mar. 2010, pp. 153-157.
Tang et al., "True Random Number Generator Circuits Based on Single- and Multi-Phase Beat Frequency Detection," Proceedings of the Custom Integrated Circuits Conference, Sep. 15-17, 2014, available from IEEE Nov. 6, 2014, 4 pp.
Tehrani et al., "Fully Parallel Stochastic LDPC Decoders," IEEE Transactions on Signal Processing, vol. 56, No. 11, Nov. 2008, 12 pp.
Tehrani et al., "Majority-Based Tracking Forecast Memories for Stochastic LDPC Decoding," IEEE Transactions on Signal Processing, vol. 58, No. 9, Sep. 2010, 14 pp.
Tehrani et al., "Stochastic Decoding of LDPC Codes," IEEE Communications Letters, vol. 10, No. 10, Oct. 2006, 3 pp.
Tsitsiklis et "Distributed Asynchronous Deterministic and Stochastic Gradient Optimization Algorithms," IEEE Transactions on Automatic Control, vol. AC-31, No. 9, Sep. 1986, 10 pp.
Wilhelm et al., "Stochastic Switching Circuit Synthesis," Information Theory, Jul. 6-11, 2008, IEEE online Aug. 8, 2008, 16 pp.
Zhu et al., "Binary Stochastic Implementation of Digital Logic," Proceedings of the 2014 AVM/SIGDA International Symposium on Field-programmable Gate Arrays, Feb. 2014, 9 pp.
Prosecution History from U.S. Appl. No. 15/618,530, dated Nov. 9, 2017 through Jul. 30, 2018, 53 pp.

* cited by examiner

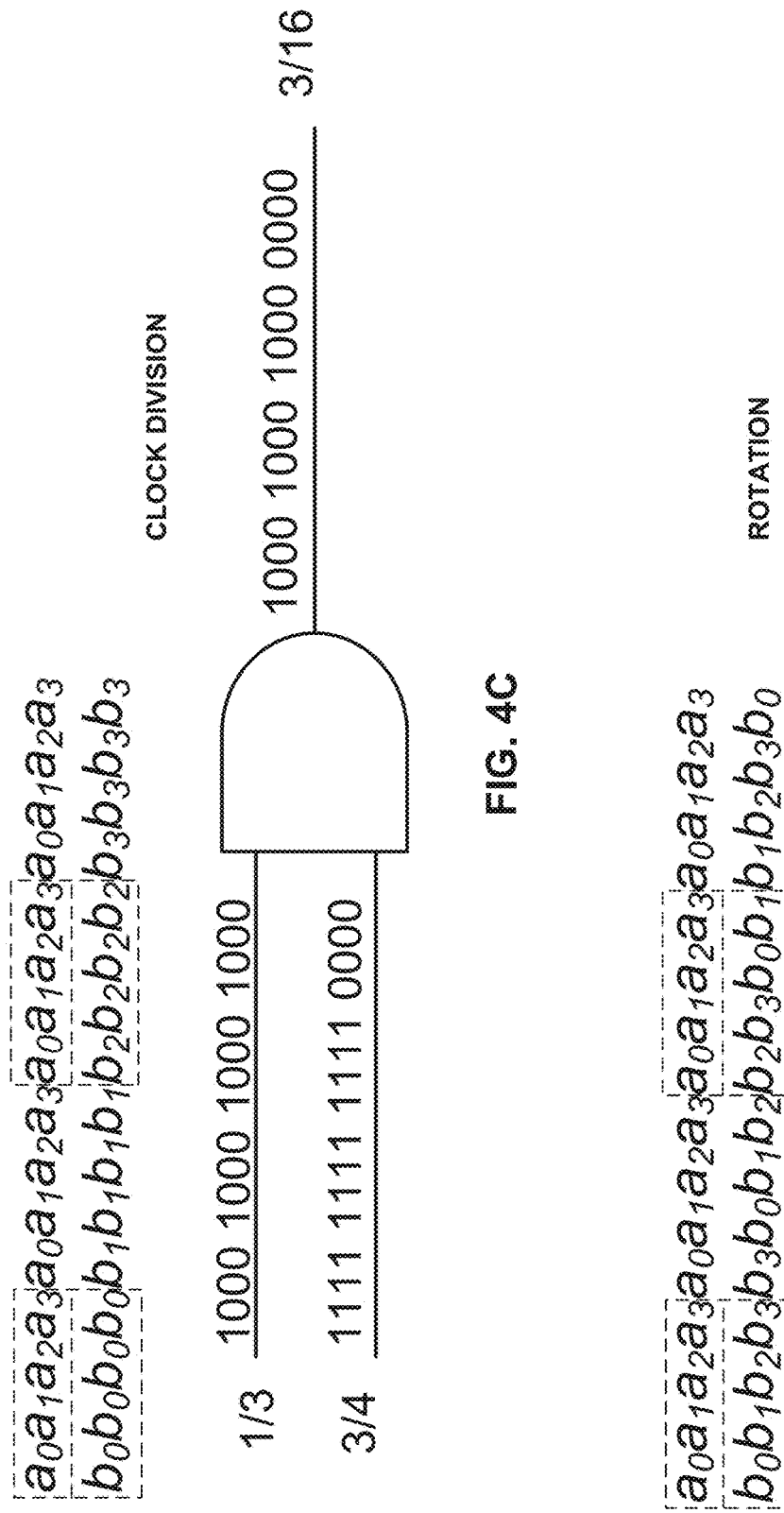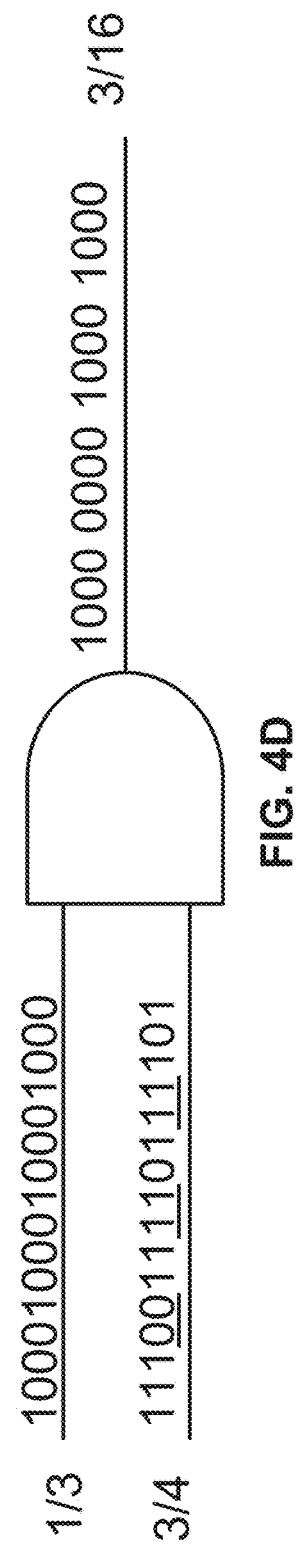
FIG. 4C
FIG. 4D

RELATIVELY
PRIME LENGTHS

CLOCK DIVISION

ROTATION

HIGH QUALITY DOWN-SAMPLING FOR DETERMINISTIC BIT-STREAM COMPUTING

This application claims the benefit of U.S. Provisional Patent Application No. 62/643,369 (filed Mar. 15, 2018), the entire content being incorporated herein by reference.

GOVERNMENT INTEREST

This invention was made with government support under CCF-1408123 awarded by National Science Foundation. The government has certain rights in the invention.

TECHNICAL FIELD

The invention relates to electronic circuits and, in particular, performing arithmetic operations and complex mathematical functions in electronic circuits.

BACKGROUND

Stochastic computing (SC) has been around for many years as a noise-tolerant approximate computing approach. Logical computation is performed on probability data represented by uniformly distributed random bit-streams. Image and video processing, digital filters, low-density parity check decoding and neural networks, have been the main target applications for SC. Low hardware cost and low power consumption advantages of this computing paradigm have encouraged designers to implement complex calculations in the stochastic domain.

Deterministic approaches to SC remove the random fluctuation and correlation problems of SC, producing completely accurate results with stochastic logic. For many applications of SC, such as image processing and neural networks, completely accurate computation may not be required for all input data. Decision-making on some input data can be done in a much shorter time using only a good approximation of the input values. While the deterministic approaches to SC are appealing by generating completely accurate results, the cost of precise results makes the deterministic approaches energy inefficient for the cases when slight inaccuracy is acceptable.

SUMMARY

In general, techniques are described that provide high quality down-sampling for deterministic methods of stochastic computing by generating pseudo-random—but accurate—stochastic bit streams. The techniques provide many technical improvements, such as much better accuracy than conventional unary-stream based deterministic techniques for stochastic computing for a given number of input bits. Moreover, the accuracy and the energy consumption are also improved compared to conventional random stream-based stochastic implementations.

In this disclosure, down-sampling techniques for various deterministic stochastic computing approaches are described that improve the progressive precision property of the approaches. By modifying the structure of the stream generators, the enhanced deterministic methods not only are able to produce completely accurate results, they are also able to produce acceptable results in a much shorter time and with a much lower energy consumption compared to current architectures that generate and process unary streams.

In other words, this disclosure describes high quality down-sampling approaches that can be applied to deterministic techniques used in stochastic computing. The techniques provide the technical advantages of bringing randomization back into the representation of deterministically generated bit-streams. Similar to processing unary streams, which can be deterministically generated for example, the computations are completely accurate when the operations are executed for the required number of cycles. However, by pseudo-randomizing the streams, the computation will have a good progressive precision property and truncating the output streams by running for fewer clock cycles still produces high quality outputs.

Example applications include sensor-based circuitry, image processing circuitry, specialized circuitry for neural networks and machine learning applications. Additional examples are described herein.

BRIEF DESCRIPTION OF DRAWINGS

FIGS. 4A-4D are block diagrams illustrating examples of performing stochastic multiplication on random streams and deterministic streams.

DETAILED DESCRIPTION

This disclosure describes techniques for high-quality down-sampling for deterministic approaches to stochastic computing (SC). The down-sampling method may include generating pseudo-random—but accurate—stochastic bit-streams. The end result is a much better accuracy for a given number of input bits. Experimental results show that with the proposed techniques the processing time and the energy consumption of these deterministic methods are improved up to 61% and 41%, respectively, while allowing a mean absolute error (MAE) of 0.1%, and up to 500× and 334× improvement, respectively, for an MAE of 3.0%. The accuracy and the energy consumption are also improved compared to conventional random stream-based stochastic implementations.

Recently proposed deterministic approaches to SC rely on unary-style bit-streams (i.e. streams with a sequence of 1's followed by a sequence of 0's) to produce completely accurate results. While these unary stream-based deterministic approaches are able to produce completely accurate results, they suffer from a poor progressive precision property. The output bit-stream may converge to the expected correct value very slowly. This drawback can be a major limitation to wide use of these approaches in different applications. Decision making on some inputs, particularly in image processing and neural network applications, does not require high precision operation and a low-precision estimate of the output value is sufficient. In such cases, due to the poor progressive precision property of unary streams, stochastic operations must run for a much longer time than the cases with conventional random bitstreams to produce acceptable results with small levels of inaccuracy. When small rates of inaccuracy are acceptable, using the unary stream-based deterministic approaches will lead to a very long operation time and consequently a very high energy consumption. So, high-quality down-sampling methods are required for the deterministic methods of SC to reduce the long operation time and the high energy consumption when slightly inaccuracy is acceptable.

Figure 4A:
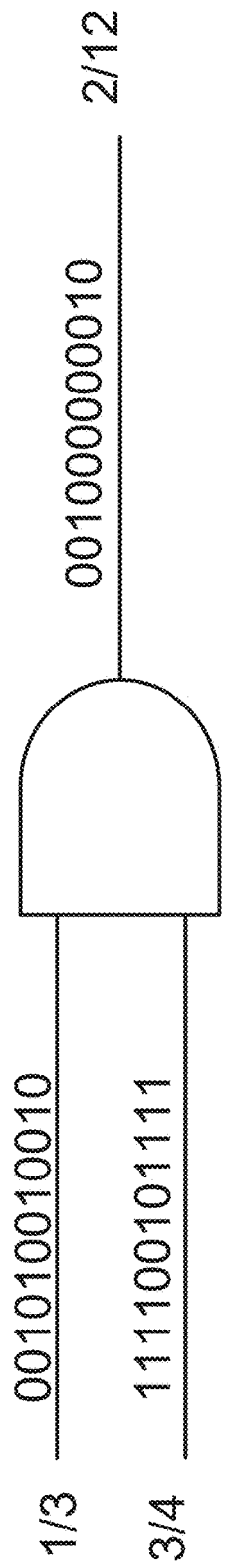
Figure 4B:
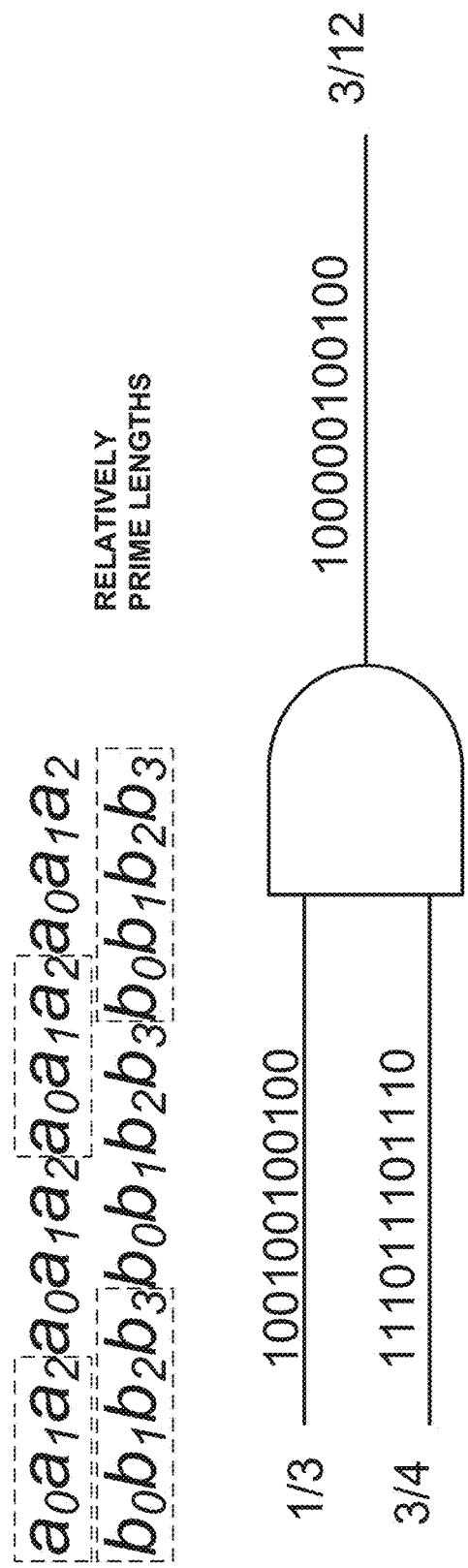

Currently, the three main deterministic approaches of SC, as shown in FIGS. 4B-4D, use unary bit-streams to produce completely accurate results. To produce accurate results with deterministic approaches, the operation must run for an exact number of clock cycles which is equal to the product of the length of the input bit-streams. Running the operation for fewer cycles will lead to a poor result with an error out of the acceptable error bound.

This disclosure describes a down-sampling method that improves the progressive precision property of recently developed deterministic approaches to SC. By modifying the structure of the bit-stream generators, the deterministic methods not only are able to produce completely accurate results, they are also able to produce acceptable results in a much shorter time and so with a much lower energy consumption compared to the current architectures that generate and process unary streams. For the same operation time, the proposed deterministic down-sampling may produce results with a lower average error rate than the error rate of processing conventional random stochastic streams.

The devices, systems, and techniques of this disclosure may be useful for digital chips operating in domains such as image and signal processing and machine learning applications. Approximate computing applications and applications that tolerate some degree of uncertainty, such as video processing, image tagging, and neural networks, may also use these devices, systems, and techniques.

Figure 1A:
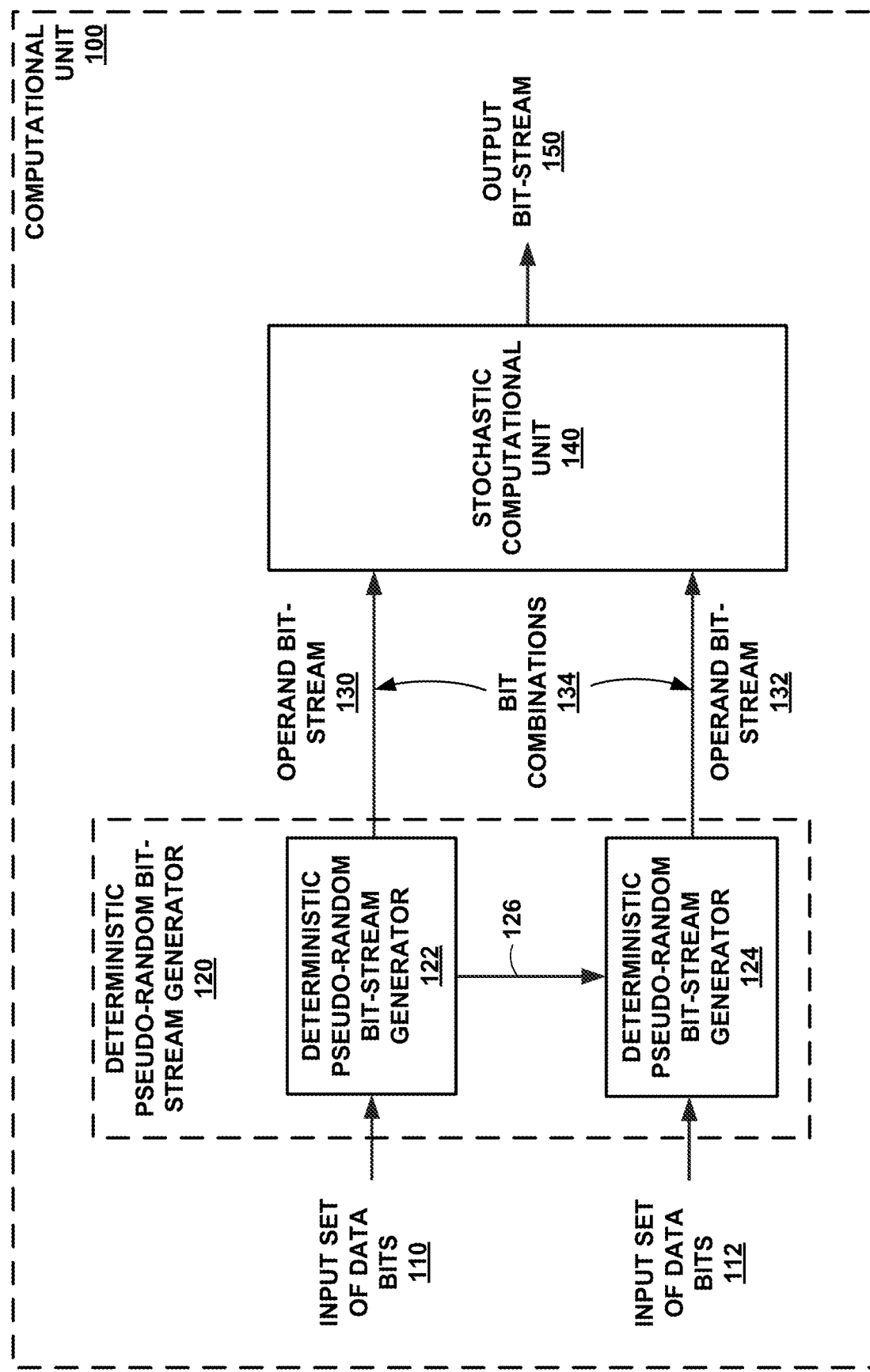
FIG. 1A is a conceptual block diagram of a computational unit configured to perform a computational operation on operand bit-streams, in accordance with some examples of this disclosure.

FIG. 1A is a conceptual block diagram of a computational unit 100 configured to perform a computational operation on bit combinations 134, in accordance with some examples of this disclosure. Computational unit 100 may be part of or include one or more integrated circuits, a sensor, an image processor, a video processing circuitry, a camera, a mobile device, or another suitable device.

Input sets of data bits 110 and 112 encode numerical values (i.e., operands), and the encoding of input sets 110 and 112 may take the form of binary encoding, unary encoding, edge coding (e.g., one-hot or one-cold coding), and/or any other type of encoding. Deterministic pseudo-random bit-stream generator 120 receives input sets 110 and 112 as parallel data bits, serial data bits, and/or a combination of parallel and serial data bits. In some examples, deterministic pseudo-random bit-stream generator 120 receives a first number encoded in input set of data bits 110 for a first computational operation and receives a second number for a second computational operation. The second number can be encoded in a new iteration of input set of data bits 110 or in input set of data bits 112. Stochastic computational unit 140 performs one or more computation operations on operand bit-stream 130 encoding the first number and the operand bit-stream 132 encoding the second number.

Deterministic pseudo-random bit-stream generator 120 is configured to receive input sets of data bits 110 and 112 and generate operand bit-streams 130 and 132 in which the input values are converted into a pseudorandom but completely accurate stochastic representation. In some examples, each of operand bit-streams 130 and 132 is a shifted, stalled, and/or rotated form of a deterministic pseudo-random bit-stream (e.g., the second deterministic pseudo-random bit-stream of FIGS. 5B and 5C). One or both of operand bit-streams 130 and 132 may be an unshifted or rotated form of a bit sequence such as a deterministic pseudo-random bit-stream (e.g., the first deterministic pseudo-random bit-stream of FIGS. 5A-5C). Deterministic pseudo-random bit-stream generator 120 includes two or more deterministic pseudo-random bit-stream generators 122 and 124 that may generate operand bit-streams 130 and 132 as bit sequences to deterministically encode the numerical values from input sets of data bits 110 and 112. Each of deterministic pseudo-random bit-stream generators 122 and 124 may encode a respective numerical value in an order of digits that is based on a function that compares two or more data bits of a deterministic pseudo-random bit-stream (e.g., a bit sequence), where the function of deterministic pseudo-random bit-stream generator 122 is different than the function of deterministic pseudo-random bit-stream generator 124. The function of each of deterministic pseudo-random bit-stream generators 122 and 124 may be based on a function of a pseudo-random generator, as described with respect to FIG. 1B below.

In addition or in the alternative, each of deterministic pseudo-random bit-stream generators 122 and 124 may use a different seed to further increase the accuracy of computational operations. The use of different seeds and/or different functions can increase the accuracy of computational operations by ensuring that bit combinations 134 represent a pseudo-random sampling of the bits in a bit sequence. A different set of pseudo-random numbers can be generated using a different function or a different seed or both. Thus, each bit in the first bit sequence represented by operand bit stream 130 is pseudo-randomly matched with bits in the second bit sequence so that the result of the computational operation approaches 100% accuracy more quickly than unary bit-stream-based processing can approach 100% accuracy.

Each of deterministic pseudo-random bit-stream generators 122 and 124 also receives a clock signal. In some examples, deterministic pseudo-random bit-stream generator 124 receives control signal 126 as a clock signal from deterministic pseudo-random bit-stream generator 122 (see, e.g., FIG. 7B). Deterministic pseudo-random bit-stream generator 124 may instead receive control signal 126 as an inhibit signal or a reset signal from deterministic pseudo-random bit-stream generator 122 (see, e.g., FIG. 7C).

Operand bit-streams 130 and 132 may include a signal that is digital in value (e.g., 0 volts=low, 1 volt=high). For example, operand bit-streams 130 and 132 may include a string of zeroes and ones (e.g., low and high voltage levels) to encode a numerical value. For example, the value of 0.3 may be encoded in ten data bits as 1001000010 or 0110000100. In contrast, a unary bit-stream always encodes 0.3 in ten data bits as 1110000000 or 0000000111, where the three one's are moved to the beginning or end of the bit-stream and the seven zeroes are moved to the beginning or end of the bit-stream. Edge coding encodes 0.3 in ten data bits as 0000001000 for one-hot coding or 1111110111 for one-cold coding. Moreover, a stochastic bit-stream may encode 0.3 in a manner that may appear similar to operand bit-streams 130 and 132, but each data bit in the stochastic bit-stream is random or pseudo-random. Thus, the next bit in each of operand bit-streams 130 and 132 may be predictable based on the seeds and functions of deterministic pseudo-random bit-stream generator 122 and 124, but the next bit in a stochastic bit-stream may not be predictable.

Stochastic computational unit 140 represents a functional component, e.g., a processing unit and/or a digital logic unit, designed to perform operations, such as arithmetic operations, image processing, video processing, signal processing, and the like. Stochastic computational unit 140 may include stochastic processing circuitry such one or more logic gates (e.g., AND gates, OR gates, XOR gates, etc.), transistors, resistors, capacitors, diodes, and/or any other suitable components. Stochastic computational unit 140 receives bit combinations 134 as parallel bits of operand bit-streams 130 and 132 (see, e.g., FIGS. 5A-5C).

Output bit-stream 150 may encode the result of the computational operation performed by stochastic computational unit 140. For example, if the computational operation is a multiplication operation, the numerical value encoded by output bit-stream 150 may be equal to, or approximately equal to, the product of the numerical values encoded by input sets of data bits 110 and 112. If input set of data bits 110 encodes a numerical value of 0.5, input set of data bits 112 encodes a numerical value of 0.6, and stochastic computational unit 140 performs a multiplication operation, then output bit-stream 150 may encode a numerical value of 0.3 (0.5×0.6). Output bit-stream 150 may have a length that is less than $2^{2N}$ data bits, where numbers 168 and 182 (shown in FIG. 1B) have a length of N data bits, and operand bit-streams 130 and 132 have lengths of $2^N$ data bits.

Figure 1B:
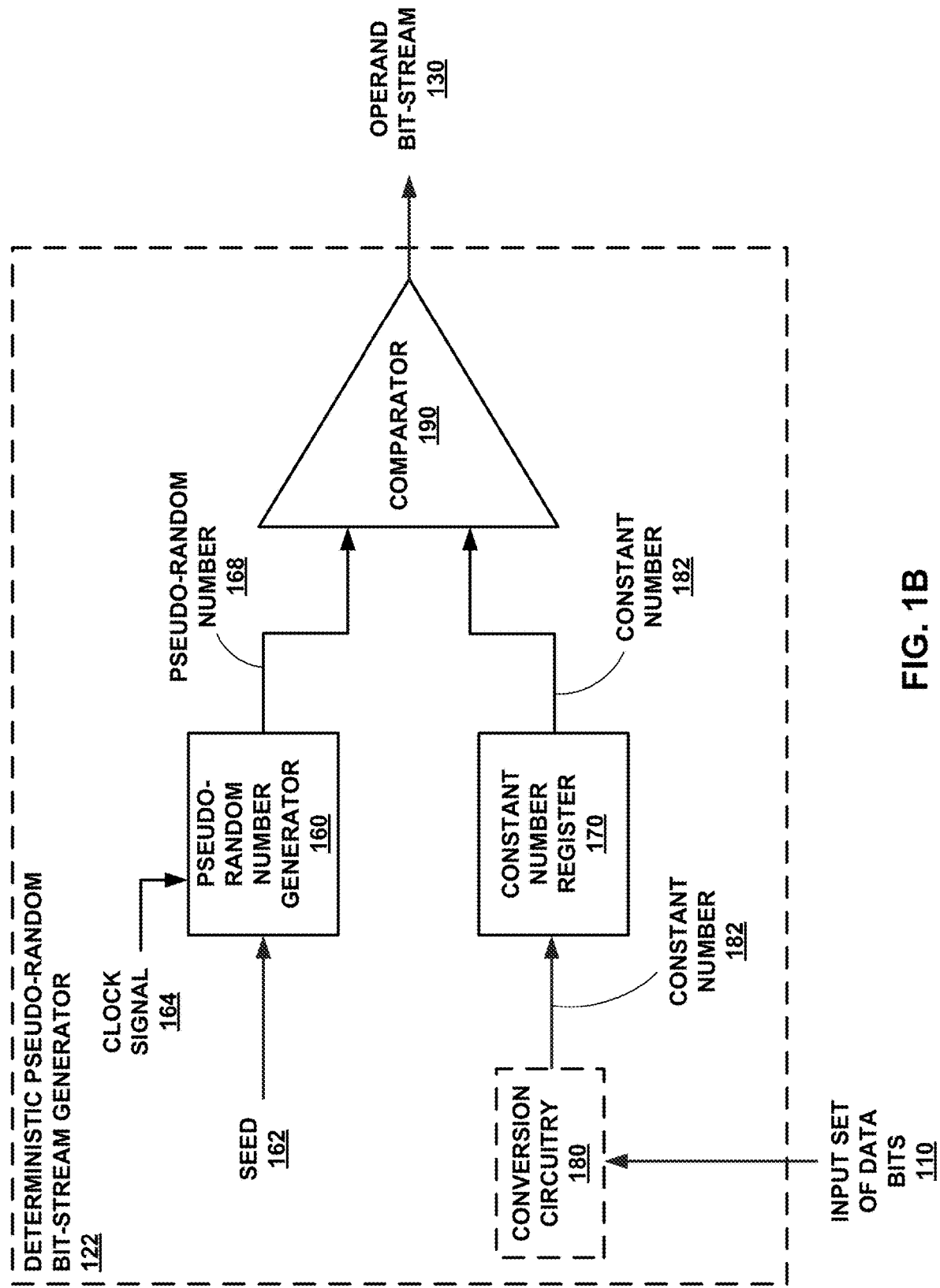
FIG. 1B is a conceptual block diagram of a deterministic pseudo-random bit-stream generator configured to generate an operand bit-stream based on comparing a pseudo-random number and a constant number, in accordance with some examples of this disclosure.

FIG. 1B is a conceptual block diagram of a deterministic pseudo-random bit-stream generator 120 configured to generate a deterministic pseudo-random bit-stream 130 based on comparing a pseudo-random number 168 and a constant number 182, in accordance with some examples of this disclosure. The structure of deterministic pseudo-random bit-stream generator 124 of FIG. 1A may be similar to the structure of deterministic pseudo-random bit-stream generator 122 shown in FIG. 1B. However, deterministic pseudo-random bit-stream generator 122 receives clock signal 164, while deterministic pseudo-random bit-stream generator 124 receives control signal 126 in addition to or as a substitute for clock signal 164. Thus, bit combinations 134 include pairs of bits from operand bit-streams 130 and 132 that are scrambled or shuffled so that output bit-stream 150 converges on an accurate result more quickly than unary-stream-based deterministic methods of stochastic computing.

Pseudo-random number generator 160 may be configured to generate pseudo-random number 168 based on a function, seed 162, and clock signal 164. Pseudo-random number generator 160 may include an N-bit linear-feedback shift register (LFSR) that generates one or more pseudo-random bits for each cycle of clock signal 164, unless an inhibit signal is active to prevent the pseudo-random number generator 160 from generating a new value for pseudo-random number 168. Each pseudo-random bit may be based on the function or design of pseudo-random number generator 160, which may be implemented through logic circuitry that receives one or more bits from pseudo-random number 168 to generate the new pseudo-random bit(s). For each new pseudo-random bit, the other bits in pseudo-random number generator 160 may shift one space. Even though pseudo-random number generator 160 generates only one new bit each clock cycle, pseudo-random number generator 160 may output a new iteration of N-bit pseudo-random number 168 to comparator 190 each clock cycle. Thus, over two or more clock cycles, pseudo-random number generator 160 generates a series of N-bit pseudo-random numbers 168 for input to comparator 190.

Figure 7A:
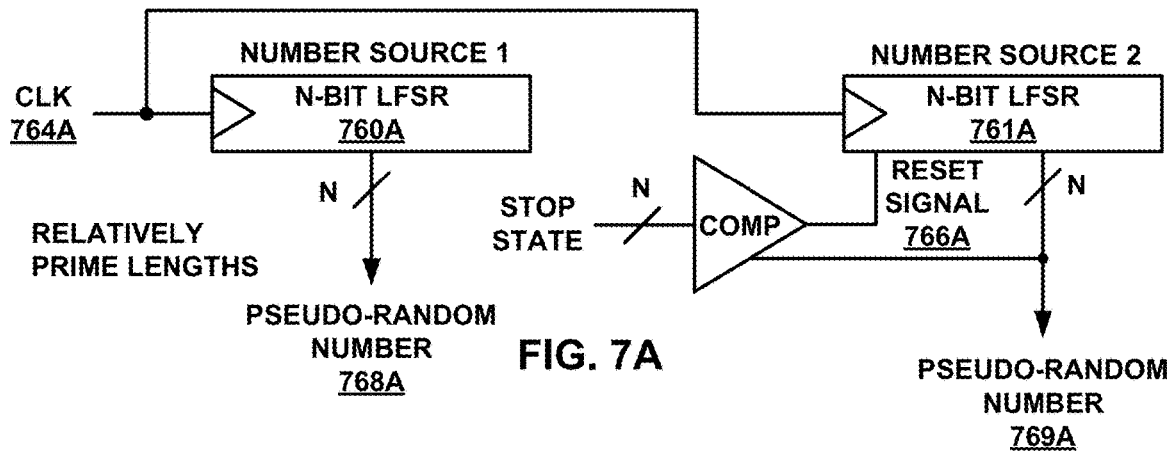
FIGS. 7A-7C are block diagrams illustrating example circuits for generating pseudo-random numbers for the three deterministic pseudo-random approaches to SC.
Figure 7B:
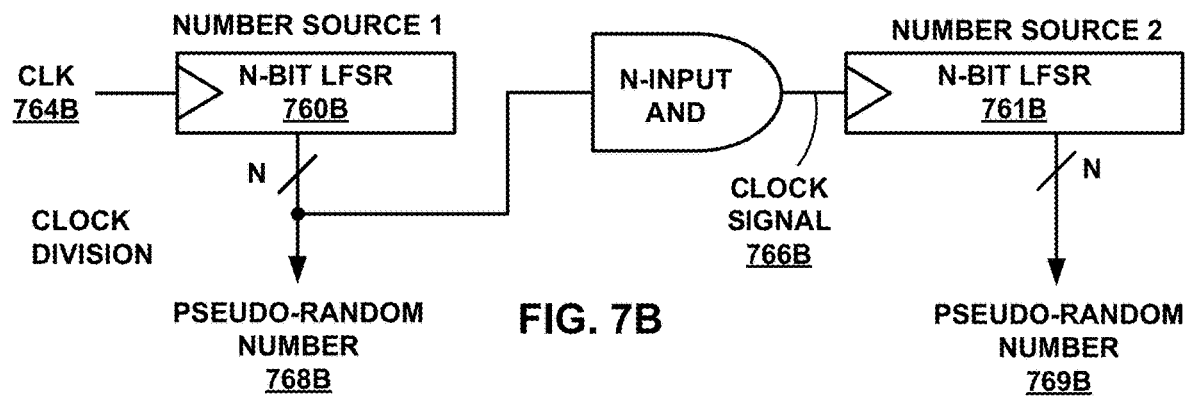
Figure 7C:
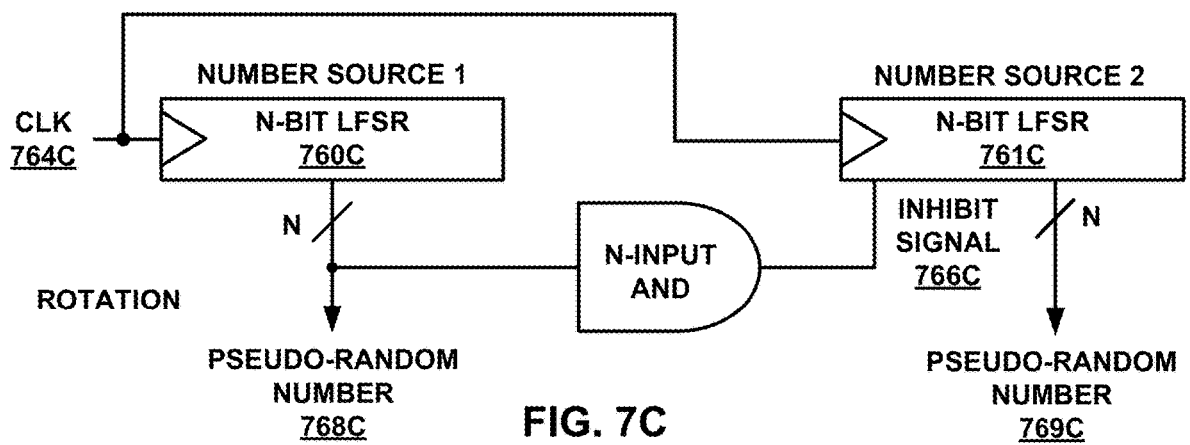

Pseudo-random number generator 160 may include an N-bit LFSR that is configured to generate seed 162 (e.g., an N-bit seed) during a first clock cycle, then generate the remaining ($2^N$–2) pseudo-random numbers, before generating seed 162 again. The order of pseudo-random numbers may be determined by the function or design of the LFSR. Seed 162 may be the initial value of pseudo-random number 168, and seed 162 may be stored in a separate register or other memory device. FIGS. 7A-7C depict examples of clock signal 164, and FIG. 7C depicts an example of an inhibit signal.

Constant number register 170 may be configured to store constant number 182 for the duration of a computational operation. Constant number 182 can come directly from a sensor, rather than being stored in register 170. In some examples, constant number 182 and pseudo-random number 168 may be N-bit binary numbers, and comparator 190 may include an N-bit comparator. Constant number register 170 may be configured to store and deliver constant number 182 to a first input node of comparator 190 as pseudo-random number generator 160 delivers pseudo-random numbers to a second input node of comparator 190. Input set of data bits 110 may include an N-bit binary number that is stored as constant number 182 in constant number register 170. Generator 160 and register 170 may have a length that is greater than or equal to N data bits in order to facilitate operation on the input number.

Conversion circuitry 180 is an optional component of deterministic pseudo-random bit-stream generator 122. Conversion circuitry 180 may be configured to convert input set of data bits 110 from a first format to a second format. For example, the first format and/or the second format may be one of the following encoding schemes: unary encoding, edge encoding, binary encoding, stochastic encoding, deterministic encoding, and/or any other suitable format.

Comparator 190 may be configured to generate operand bit-stream 130 based on the relative values of pseudo-random number 168 and constant number 182. In some examples, comparator 190 may generate a high value for operand bit-stream 130 if pseudo-random number 168 is less than or equal to constant number 182 and a low value if pseudo-random number 168 is greater than constant number 182. Comparator 190 may include an N-bit comparator configured to compare two N-bits numbers 168 and 182.

The pseudo-random deterministic operation of computational unit 100 may result in complete accuracy for operations of at least $2^{2N}$ cycles, where N is the length of numbers 168 and 182, and much better accuracy than unary or stochastic operations for less than $2^N$ cycles. Stochastic computation may have higher inaccuracies than pseudo-random deterministic operations due to random fluctuation.

Due to random fluctuation, stochastic operations often need to run for a very long time to produce highly accurate results. However, SC does not necessarily have to be an approximate computing approach. If properly structured, random fluctuation can be removed and SC circuits can produce deterministic and completely accurate results. By choosing relatively prime lengths for a specific class of stochastic streams—called unary streams, and repeating the streams up to the least common multiple of the stream lengths, a deterministic and completely accurate output can be produced by stochastic logic. Two other deterministic approaches of processing unary streams include rotation of streams and clock division. These approaches not only are able to produce completely accurate results (i.e., zero percent error rate), but these approaches also improve the hardware cost and the processing time of stochastic operations significantly when compared to the hardware cost and processing time of the computations performed on the conventional random stochastic bitstreams.

While the unary stream-based deterministic approaches are able to produce completely accurate results (i.e., results that are the same as the results of binary-radix computation), these deterministic approaches suffer from a poor progressive precision property. The output bit-stream generated by computation on unary streams converges to the expected correct value very slowly. This drawback can be a major limitation to wide use of these approaches in different applications. Decision making on some inputs, particularly in image processing and neural network applications, do not require high precision operation and a low-precision estimate of the output value is sufficient. In such cases, due to the poor progressive precision property of unary streams, stochastic operations must run for a much longer time than the cases with conventional random bitstreams to produce acceptable results with small levels of inaccuracy. When small rates of inaccuracy are acceptable, using the unary stream-based deterministic approaches will lead to a very long operation time and consequently a very high energy consumption.

Figure 2:
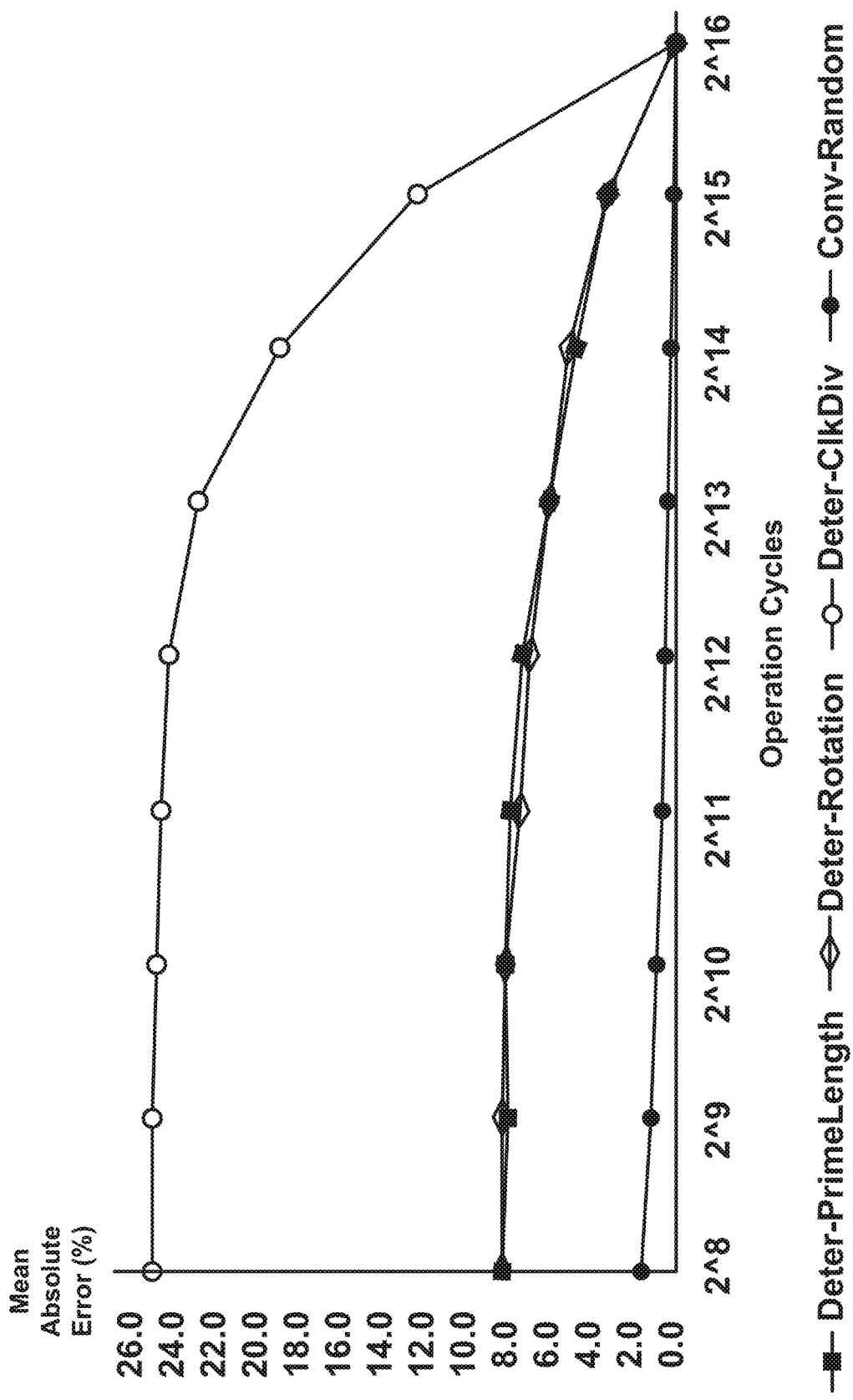
FIG. 2 is a graph illustrating a comparison of the progressive precision of the conventional random stream-based stochastic computing (SC) with the unary stream-based deterministic approaches of SC when multiplying two 8-bit precision input values.

FIG. 2 illustrates a comparison of the progressive precision of the conventional random stream-based SC with the unary stream-based deterministic approaches of SC when multiplying two 8-bit precision input values. FIG. 2 shows that the conventional random stream-based stochastic approach has a much better progressive precision than the unary stream-based deterministic approaches. Thus, the conventional random stream-based stochastic approach would be the preferable choice for any application that can tolerate some errors, such as image processing and neural network applications.

This disclosure describes a down-sampling method for deterministic approaches to improve their progressive precision property. By modifying the structure of the stream generators, the deterministic methods not only are able to produce completely accurate results, the deterministic methods are also able to produce acceptable results in a much shorter time and with a much lower energy consumption compared to the current architectures that generate and process unary streams. The experimental results further show that, for the same operation time, deterministic down-sampling of the rotation and the relatively prime length approaches produces results with a lower average error rate than the error rate of processing conventional random stochastic streams.

In SC, computation is performed on random or unary bit-streams where the input value is encoded by the probability of obtaining a one versus a zero. Unipolar and bipolar formats are the two general representations for numbers in the stochastic domain. While the unipolar format can only be used for representing positive data in interval [0, 1], the bipolar format can deal with both positive and negative values in [−1, 1]. In the unipolar representation, the ratio of the number of ones to the length of bit-stream determines the value, while in the bipolar format, the value is determined by the difference between the number of ones and zeros compared to the stream length. For example, 1101010000 is a representation of 0.4 in the unipolar format and −0.2 in the bipolar format. This disclosure describes techniques using the unipolar format, but these techniques are independent of the format of bit-streams and can also be applied to the bipolar representation.

The inputs to stochastic systems must first be converted to stochastic bit-streams to be processed by stochastic logic. The common approach for converting digital data in binary radix format into random stochastic bit-streams is by comparing a random value generated by a random or pseudo-random source to the target value. Linear feedback shift registers (LFSRs) are often used as the pseudo-random source in these stream generators. To convert binary input data to unary streams, an increasing/decreasing value from an up/down counter is compared to the target value.

Figure 3:
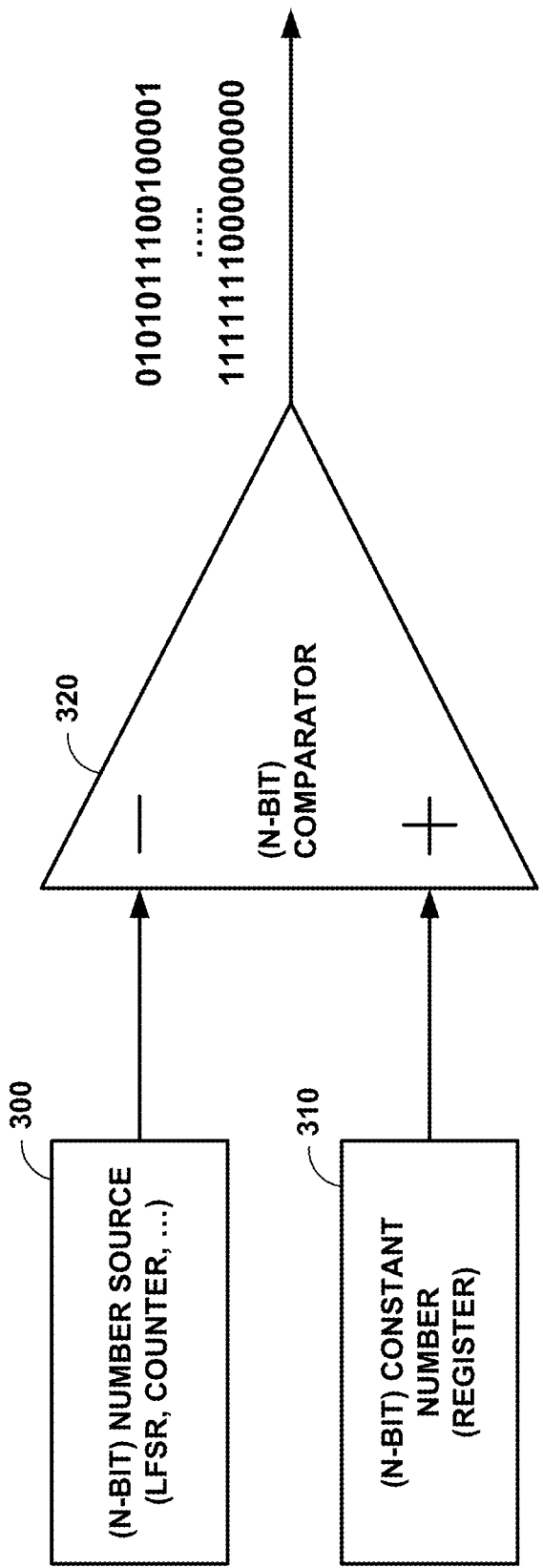
FIG. 3 is a block diagram illustrating an example structure of a stochastic stream generator.

FIG. 3 illustrates an example structure of a stochastic stream generator. Number source 300 is an example of pseudo-random number generator 160 in FIG. 1B, constant number register 310 is an example of register 170 in FIG. 1B, and comparator 320 is an example of comparator 190 in FIG. 1B. Constant number register 310 may store an N-bit binary number between zero and $2^N 1$. Number source 300 may be configured to generate an N-bit binary number between zero and $2^N-1$. When the generated number is greater than the constant number, comparator 320 may output a zero. When the generated number is less than or equal the constant number, comparator 320 may output a one. Thus, if the constant number stored in register 310 is relatively close to the maximum value of number source 300 (e.g., $2^N-1$), comparator 320 may output a higher proportion of ones. If the constant number stored in register 310 is relatively close to zero, comparator 320 may output a higher proportion of zeroes. In some examples, the inverting input and the non-inverting input of comparator 320 may be switched so that comparator 320 may produce a one when the generated number is higher than the constant number.

When performing computation on random stochastic bit-streams, due to the inherent random fluctuations, the lengths of bit-streams have to be much longer than the precision expected for the computation result. Some operations, such as multiplication, also suffer from correlation between bit-streams. For these operations, the input bitstreams must be independent to produce accurate results. To produce an output with N-bit precision, the input bitstreams length, and so the number of cycles performing the operation, must be greater than $2^{2Ni-2}$, where i is the number of independent inputs in the circuit. Due to these properties, stochastic processing of random bit-streams is an approximate computation, as illustrated in FIG. 4A. The multiplication operation in FIG. 4A is not accurate because of the randomness of the bit-streams. The result of this stochastic operation is 2/12, but the expected answer is 3/12. This inaccuracy is due to random fluctuation that is inherent in stochastic operations.

FIGS. 4A-4D illustrate examples of performing stochastic multiplication on random streams and deterministic streams. Recent work on SC has shown that SC does not necessarily have to be an approximate approach and the result of computation can actually be completely accurate and deterministic. Instead of random stochastic bit-streams, logical computation is performed on a specific class of bitstreams, called unary streams. A unary stream consists of a sequence of 1's followed by a sequence 0's. For example, 1111000000 is a unary stream representing 0.4 in the unipolar format. To represent a value with resolution of $\frac{1}{2}^N$ (N-bit precision), the unary stream must be $2^N$ bits long. For operations that require independent inputs, the independence between the input unary streams is provided by using relatively prime stream lengths, rotation, or clock division.

FIGS. 4B-4D exemplifies these three deterministic approaches to SC. FIG. 4B illustrates a relatively prime method with bit-stream lengths of three and four. The first deterministic bit-stream (100) is repeated four times, and the second deterministic bit-stream (1110) is repeated three times. FIG. 4C illustrates the clock division method, in which the first deterministic bit-stream (1000) is repeated four times. In the clock division method, each bit of the second deterministic bit-stream (1110) is repeated four times before moving on to the next bit. FIG. 4D illustrates the rotation method, in which the first bit-stream (1000) is repeated four times. In the rotation method, each bit of the second deterministic bit-stream (1110) is stalled once at the multiples of four. Thus, each bit of the first deterministic bit-stream is paired with each bit of the second bit-stream for each of the relatively prime, clock division, and rotation methods.

To produce accurate results with these deterministic approaches, the operation must run for an exact number of clock cycles which is equal to the product of the length of the input bit-streams. For example, when multiplying two N-bit precision input values represented using two $2^N$-bit-streams, the operation must run for exactly $2^{2N}$ cycles. Running the operation for fewer cycles (e.g., $2^{2N-1}$ cycles) will lead to a poor result with an error out of the acceptable error bound. This important source of inaccuracy in performing computations on unary streams is called "truncation error."

As an example, a stochastic computational unit multiplies two 8-bit precision numbers, represented using unary streams, with the rotation or clock division deterministic approaches. The operation must run for exactly $2^{16}$=65536 cycles to produce a completely accurate result. Exhaustively testing the multiplication operation on a large set of random pairs of input values when running the operation for $2^{15}$ and $2^{10}$ cycles shows a mean absolute error (MAE) of 3.12% and 7.98%, respectively, for the rotation approach, and 12.3% and 24.4% for the clock division approach. The conventional approach of processing random bit-streams does not produce completely accurate multiplication results in $2^{16}$ cycles, but a good progressive precision property could lead to acceptable results when running the operation for the same number of operation cycles (MAE of 0.11% after $2^{15}$ and 0.89% after $2^{10}$ cycles).

While the randomness inherent in stochastic bit-streams was one of the main sources of inaccuracy in SC, distributing the ones across the stream instead of grouping the ones (i.e., first all ones and then all zeros) may be able to provide a good progressive precision property for representing stochastic numbers and, therefore, for the computation. With randomized bit-streams, the quality of the result improves as the computation proceeds. This is because short sub-sequences of long random stochastic bit-streams provide low-precision estimates of the streams' values. This property can be exploited in many applications of SC for making quick decisions on the input data and so increasing the processing speed.

Deterministic approaches perform computation on unary streams. Due to the nature of unary representation, truncating the bit-stream leads to a high truncation error and thus a significant change in the represented value. As described herein, a high quality down-sampling approach for the deterministic approaches to SC is accomplished by bringing randomization back into the representation of bit-streams. Similar to processing unary streams, the computations are completely accurate when the operations are executed for the required number of cycles, where the required number of cycles can be the product of the length of the operand bit-streams. However, by pseudo-randomizing the streams, the computation will have a good progressive precision property and truncating the output streams by running for fewer clock cycles still produces high quality outputs. Additional example details of deterministic approaches, including are described in commonly assigned U.S. Patent Application Publication No. 2018/204131 filed Jan. 12, 2018, entitled "Stochastic Computation Using Pulse-Width Modulated Signals," the entire content of which is incorporated herein by reference.

For a deterministic and predictable randomization of the bit-streams, maximal period pseudo-random sources (i.e., a maximal period LFSR) may be configured to generate the bit-streams. In some examples, the period of the pseudo-random number source may be equal to the length of the bit-stream. By using a pseudo-random number generator with a maximal period to generate pseudo-random numbers, the number generator converts an input value into a pseudorandom, but completely accurate bit-stream representation. Bit-streams (A), (B), and (C), shown below, are examples of representing 0.5 value with a random bit-stream, a unary bit-stream, and a proposed pseudo-randomized bit-stream that can be generated by an LFSR. Bit-stream (A) is not an accurate representation of 0.5 because only seven of the sixteen bits are one, which is an example of the inaccuracy that can occur when generating stochastic bit-streams.

| (A) | Stochastic randomized bit-stream | 0101011100100001 | (7/16) |
|---|---|---|---|
| (B) | Deterministic unary bit-stream | 1111111100000000 | (8/16) |
| (C) | Deterministic pseudo-randomized bit-stream | 1000110100010111 | (8/16) |

TABLE 1

Mean Absolute Error (%) comparison of the prior random and deterministic approaches to stochastic computing and the proposed deterministic approaches based on pseudo-randomized streams when multiplying two 8-bit precision stochastic streams with different numbers of operation cycles.

| Design Approach | SNG | $2^{16}$ | $2^{15}$ | $2^{14}$ | $2^{13}$ | $2^{12}$ | $2^{11}$ | $2^{10}$ | $2^9$ | $2^8$ | $2^7$ | $2^6$ |
|---|---|---|---|---|---|---|---|---|---|---|---|---|
| Conventional Random Stochastic | Two LFSR-8 | 0.83 | 0.83 | 0.83 | 0.83 | 0.83 | 0.83 | 0.83 | 0.83 | 0.83 | 0.83 | 0.83 |
| | Two LFSR-16 | 0.05 | 0.15 | 0.26 | 0.39 | 0.58 | 0.79 | 1.20 | 1.67 | 2.32 | 3.32 | 4.72 |
| Deterministic Prime Length | Two counter-8 | 0.00 | 3.03 | 4.70 | 6.01 | 7.08 | 7.62 | 7.90 | 7.98 | 8.11 | 33.2 | 51.5 |
| | This work: two LFSR-8 | 0.00 | 0.09 | 0.16 | 0.24 | 0.34 | 0.47 | 0.60 | 0.72 | 0.85 | 2.56 | 4.22 |
| Deterministic Clock Division | Two counter-8 | 0.00 | 12.3 | 18.7 | 21.8 | 23.4 | 24.0 | 24.4 | 24.5 | 24.9 | 49.6 | 62.2 |
| | This work: two LFSR-8 | 0.00 | 1.44 | 2.48 | 3.74 | 5.28 | 7.18 | 9.91 | 14.2 | 24.8 | 25.0 | 25.8 |
| Deterministic Rotation | Two counter-8 | 0.00 | 3.10 | 4.84 | 6.15 | 7.08 | 7.66 | 7.99 | 8.17 | 8.26 | 33.1 | 51.8 |
| | This work: two LFSR-8 | 0.00 | 0.09 | 0.16 | 0.24 | 0.35 | 0.47 | 0.60 | 0.71 | 0.82 | 2.56 | 4.26 |

Table 1 compares the MAEs of the conventional random stream-based SC and the unary stream-based deterministic approaches with the approach proposed herein by exhaustively testing multiplication of two 8-bit precision stochastic streams on a large set of random input values for the conventional random SC and for the proposed approach, and on every possible input value for the unary deterministic approaches. For the conventional random stochastic approach, the accuracy is evaluated with two different structures for converting the input values to randomized stochastic bit-streams: 1) using maximal period 8-bit LFSRs, and 2) using maximal period 16-bit LFSRs to emulate a true-random number generator. Two different LFSRs (i.e., different designs with different functions and/or different seeds) are used in each case to generate independent bit-streams. For example, two out of 16 different designs of maximal period 8-bit LFSRs and two out of 2,048 different designs of maximal period 16-bit LFSRs may be randomly selected for each run.

While the first structure can accurately convert the input values to 256-bit pseudo-random bit-streams, the second structure converts the inputs to any stream with a length less than $2^{16}$ to give an approximate representation of the value. With the first structure, after 256 cycles, the generated bit-streams repeat and so the accuracy of the operation never improves after this time. Due to a more precise representation, the first structure shows a better MAE for low stream lengths. However, for very long bit-stream lengths, the second structure can produce a better MAE. The hardware cost of the second structure is twice that of the first one because of using larger LFSRs. Note that due to random fluctuation and correlation, neither of these two structures can produce completely accurate results in $2^{16}$ cycles.

As shown in Table 1, the deterministic approaches are able to produce completely accurate results for 2-input 8-bit precision multiplication when running the operation for $2^{16}$ cycles. Due to using unary bit-streams, however, the MAE of the computation increases significantly when running the operation for fewer cycles. This change clearly shows the poor progressive precision property and the high truncation error of these methods. Instead of unary streams, the techniques of this disclosure use pseudo-randomized but accurate bit-streams. Integrating these bit-streams with the deterministic approaches results in completely accurate computation when the computation is run for the required number of cycles (i.e., the product of the lengths of the operand bit-streams) while still producing high quality results if the output stream is truncated.

Figure 5A:
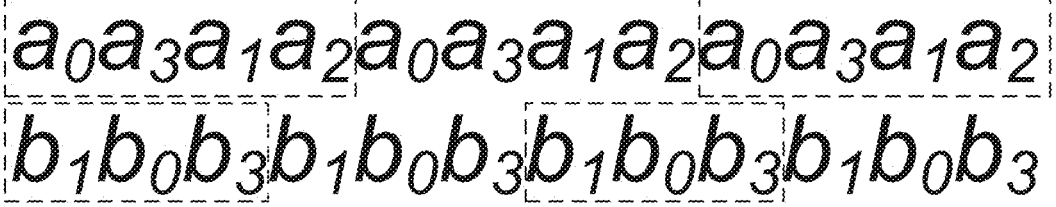
FIGS. 5A-5C are block diagrams illustrating examples of three deterministic pseudo-random approaches to SC by pseudo-randomized bit-streams.
Figure 5B:
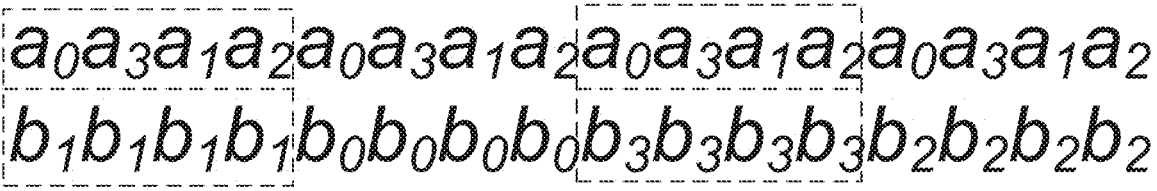
Figure 5C:
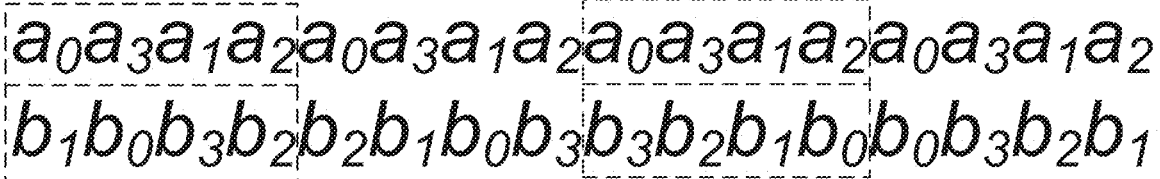

FIGS. 5A-5C illustrate examples of three deterministic approaches to SC by pseudo-randomized bit-streams. The pairs of bit-streams depicted in FIGS. 5A-5C are examples of operand bit-streams 130 and 132 in FIGS. 1A and 1B. For example, FIG. 5B depicts bit combinations of a first operand bit-stream in a first row ($a_0a_3a_1a_2a_0a_3$ ... ) and a second operand bit-stream in a second row ($b_1b_1b_1b_1b_0b_0$ ... ). In all three examples, the first operand bit-stream is a repeated version of a four-bit deterministic pseudo-random bit-stream ($a_0a_3a_1a_2$), where the four-bit bit-stream is also referred to herein as a bit sequence. In the relatively prime lengths example, each bit sequence is repeated to form the respective operand bit-stream. The second operand bit-stream in FIG. 5A is a repeated version of a three-bit deterministic pseudo-random bit-stream ($b_1b_0b_3$). The second operand bit-stream in FIG. 5B is a version of a four-bit deterministic pseudo-random bit-stream ($b_1b_0b_3b_2$) with three inhibit cycles for every step through the deterministic pseudo-random bit-stream. The second operand bit-stream in FIG. 5C is a version of a four-bit deterministic pseudo-random bit-stream ($b_1b_0b_3b_2$) with one inhibit cycle for every three steps through the deterministic pseudo-random bit-stream.

For the examples shown in FIGS. 5A-5C, each data bit of a first bit sequence is paired with multiple different data bits of a second bit sequence. For example, in the relatively prime lengths example shown in FIG. 5A, $a_0$ is paired with $b_1$ in the first bit combination, $b_0$ in the fifth bit combination, and $b_3$ in the ninth bit combination. In the clock division example shown in FIG. 5B, $a_0$ is paired with $b_1$ in the first bit combination, $b_0$ in the fifth bit combination, $b_3$ in the ninth bit combination, and $b_2$ in the thirteenth bit combination. In the rotation example shown in FIG. 5C, $a_0$ is paired with $b_1$ in the first bit combination, $b_2$ in the fifth bit combination, $b_3$ in the ninth bit combination, and $b_0$ in the thirteen bit combination.

A stochastic computational unit can down-sample the bit sequences shown in FIGS. 5A-5C before performing a computational operation on the bit combinations. The stochastic computational unit can down-sample the bit sequences by truncating the computational operation before running through the full number of bits shown in FIGS. 5A-5C. The full number of bits can refer to the product of the lengths of the bit sequences, which is twelve for FIG. 5A and sixteen for FIGS. 5B and 5C. Truncating a computational operation reduces latency but can also reduce accuracy. Using the deterministic pseudo-random techniques described herein leads to higher accuracy for truncated or down-sampled operations, as compared to using truncated stochastic or unary bit-streams.

In the deterministic approaches to SC, the required independence between input streams is provided by using relatively prime lengths, rotation, or clock division. When running the operations for the product of the length of the streams, these three methods cause every bit of the first stream to interact with every bit of the second stream. The computation is therefore performed deterministically and accurately irrespective of the location of the ones in each stream. Thus, as demonstrated in FIGS. 5A-5C with the interaction of two pseudo-randomized bit-streams, there is actually no requirement to use unary-style streams and, instead, we use pseudo-randomized bitstreams for the deterministic approaches. Additional example details of unary-style streams, as well as the relatively prime lengths method, the clock division method, and the rotation method, are described in commonly assigned U.S. Patent Application Publication No. 2017/0359082 filed Jun. 9, 2017, which issued as U.S. Pat. No. 10,063,255 on Aug. 28, 2018, and entitled "Stochastic Computation Using Deterministic Bit Streams," the entire content of which is incorporated herein by reference.

The deterministic pseudo-random bit-stream generators may use different LFSRs (i.e., different LFSR functions and/or different seeds) for generating pseudo-randomized bit-streams. The function of an LFSR is used to generate a next bit of the pseudo-random number by comparing two or more data bits of the current number. For example, a value of the next bit can be the result of a logical XOR of the second bit and the sixth bit of the LFSR.

The period of the LFSR may be maximal and equal to the length of the bit-stream to accurately represent each value. Thus, for 8-bit precision inputs, an 8-bit size maximal period LFSR is required. Table 1 compares the MAE of the deterministic approaches when multiplying the input streams generated using the proposed approach. Similar to the unary stream-based deterministic approaches, the proposed method results in completely accurate results when running the operation for $2^{16}$ cycles, but the proposed method produces a much lower MAE, as compared to using unary bit-streams, when running for fewer cycles than $2^{16}$ cycles. Compared to the conventional random SC, the relatively prime length and the rotation approaches produce results with a lower MAE.

Similar to the unary-stream based deterministic approaches that require N separate counters for generating N independent input bit-streams, sharing LFSRs in the proposed method may not be desirable. In the clock division deterministic approach, each LFSR must be driven with a different clock source which as a result prevents using optimization techniques such as sharing LFSRs and shifting to save hardware cost. Similarly, the limitations of using number sources with different periods in the relatively prime approach and stalling number generators in the rotation approach prevents the architecture from sharing pseudo-random number generators in the proposed method. Since each LFSR in this method is driven by a different clock source, in spite of using similar LFSR designs, sharing one LFSR for generating both inputs may not be possible.

Figure 6:
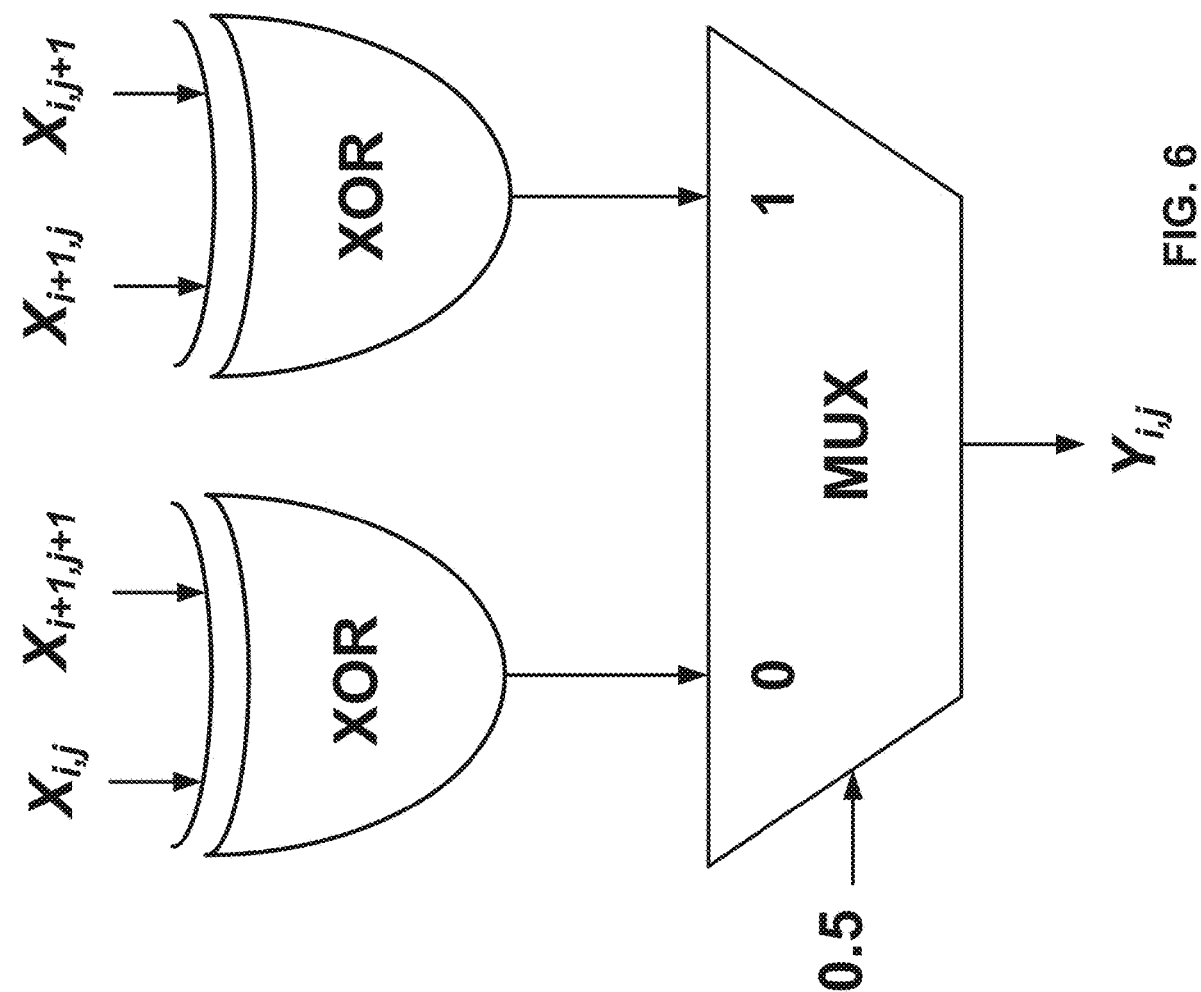
FIG. 6 is a block diagram illustrating a stochastic circuit for Robert's cross edge detection algorithm.

The stochastic implementation of a well-known digital image processing algorithm, Robert's cross edge detection, was used to evaluate the proposed architecture. In this edge detector, each operator consists of a pair of 2×2 convolution kernels that process the pixels of the input images based on their three immediate neighbors, as shown in Equation (1). In Equation (1), $X_{i,j}$ is the value of the pixel at location (i, j) of the input image and $Y_{i,j}$ is the corresponding output value. FIG. 6 shows the stochastic implementation of Equation (1), which includes a two-input XOR gate feeding into each input node of a one-bit multiplexer.

$$Y_{i,j} = 0.5 \times (|X_{i,j} - X_{i+1,j+1}| + |X_{i,j+1} - X_{i+1,j}|) \qquad (1)$$

FIG. 6 illustrates a stochastic circuit for Robert's cross edge detection algorithm. The two XOR gates of FIG. 6 compute absolute value subtraction when they are fed with correlated input streams (streams with maximum overlap between ones). Sharing the same source of numbers (i.e., same LFSR) for generating the input streams can provide correlated streams. The Multiplexer (MUX) unit, on the other hand, performs scaled addition irrespective of correlation between its main input streams. The select input stream (here, a stream with the value 0.5) should be independent to the main input streams to the MUX. Thus, for the Robert's cross stochastic circuit, the four main input streams (the inputs to the XOR gates) should be correlated to each other, but should be independent of the select input of the MUX. Two number generators are, therefore, required for this circuit—one for converting the main inputs and one for generating the select input stream.

Table 2 shows the result of an evaluation of the performance, the hardware area, the power, and the energy consumption of the Robert's cross stochastic circuit in three different cases: 1) the conventional approach of processing random streams, 2) the prior deterministic approaches of processing unary streams, and 3) the proposed deterministic approaches of processing pseudo-randomized streams. The circuit shown in FIG. 6 is the core stochastic logic and will be shared between all cases.

TABLE 2

Area (μm²), Power (mW) (@ 1 GHz), and Energy consumption (pJ) of the Robert's cross stochastic circuit synthesized with the 8- and 16-bit conventional random approach, and also the prior structures and the proposed structures of the three deterministic approaches (Relatively Prime Lengths, Clock Division, and Rotation).

| Design Approach | Area (μm²) | Power (mW) | Target Error (MAE) | | | | | | |
|---|---|---|---|---|---|---|---|---|---|
| | | | 0% | | 0.1% | | 0.3% | | 0.5% | |
| | | | Cycle | Energy | Cycle | Energy | Cycle | Energy | Cycle | Energy |
| Conv-Random-8 | 671 | 0.818 | — | — | — | — | — | — | — | — |
| Conv-Random-16 | 1415 | 1.633 | 2'16> | 10'5> | 54410 | 88,852 | 11370 | 18,567 | 4380 | 7,153 |
| PrimeL-Prior | 689 | 0.560 | 64770 | 36,271 | 64210 | 35,958 | 63150 | 35,364 | 62070 | 34,759 |
| PrimeL-Proposed | 746 | 0.848 | 64770 | 54,925 | 25100 | 21,285 | 4000 | 3,392 | 1500 | 1,272 |
| CLKDIV-Prior | 665 | 0.304 | 65025 | 19,768 | 64830 | 19,708 | 63850 | 19,410 | 62900 | 19,122 |
| CLKDIV-Proposed | 688 | 0.527 | 65025 | 34,268 | 63730 | 33,586 | 54310 | 28,621 | 42640 | 22,471 |

TABLE 2-continued

Area (µm²), Power (mW) (@ 1 GHz), and Energy consumption (pJ) of the Robert's cross stochastic circuit synthesized with the 8- and 16-bit conventional random approach, and also the prior structures and the proposed structures of the three deterministic approaches (Relatively Prime Lengths, Clock Division, and Rotation).

| | | | | | | | | | | | |
|---|---|---|---|---|---|---|---|---|---|---|---|
| Rotation-Prior | 667 | 0.493 | 65025 | 32,057 | 64665 | 31,880 | 63445 | 31,278 | 62405 | 30,766 |
| Rotation-Proposed | 725 | 0.732 | 65025 | 47,598 | 29305 | 21,451 | 4045 | 2,961 | 1495 | 1,094 |

| | Target Error (MAE) | | | | | |
|---|---|---|---|---|---|---|
| Design | 1.0% | | 2.0% | | 3.0% | |
| Approach | Cycle | Energy | Cycle | Energy | Cycle | Energy |
| Conv-Random-8 | — | — | 170 | 139 | 100 | 82 |
| Conv-Random-16 | 1220 | 1,992 | 300 | 490 | 130 | 212 |
| PrimeL-Prior | 59510 | 33,326 | 54420 | 30,475 | 49080 | 27,485 |
| PrimeL-Proposed | 470 | 399 | 170 | 144 | 100 | 85 |
| CLKDIV-Prior | 60740 | 18,465 | 56740 | 17,249 | 53250 | 16,188 |
| CLKDIV-Proposed | 20780 | 10,951 | 6500 | 3,426 | 2980 | 1,570 |
| Rotation-Prior | 59855 | 29,509 | 54875 | 27,053 | 49575 | 24,440 |
| Rotation-Proposed | 465 | 340 | 170 | 124 | 100 | 73 |

FIGS. 7A-7C illustrate proposed source of generating pseudo-random numbers for the three deterministic approaches to SC. Each LFSR in FIGS. 7A-7C is an example of a pseudo-random number generator configured to generate an N-bit pseudo-random number. Thus, pseudo-random numbers 768A and 769A may feed into a comparator that generates a deterministic pseudo-random bit-stream (e.g., comparator 190 or 320). CLK is an example of clock signal 164 in FIG. 1B, and reset signal 766A, clock signal 766B, and inhibit signal 766C are examples of control signal 126 in FIG. 1A.

For the relatively prime length approach shown in FIG. 7A, the first number source has a period of $2^N-1$, and the period of the second source is controlled by setting a stop state. LFSR 760A may generate a new iteration of pseudo-random number 768A for every cycle of clock signal 764A, and LFSR 761A may also generate a new iteration of pseudo-random number 769A for every cycle of clock signal 764A. Here, for the Robert's cross circuit, pseudorandom number sources with periods of $2^8-1$ and $2^8-2$, are implemented. In some examples, the reset signal for LFSR 761A may be active every $2^8-2$ clock cycles, or any other suitable number of clock cycles, causing LFSR 761A to restart the iterations of pseudo-random number 769A. When the state (the output number) of LFSR 761A equals the stop state, LFSR 761A is restarted to its initial state by reset signal 766A.

For the clock division structure shown in FIG. 7B, LFSR 760B is clock divided by the period of LFSR 760B through detecting the all one state using an AND gate. LFSR 760B may generate a new iteration of pseudo-random number 768B for every cycle of clock signal 764B, and LFSR 761B may generate a new iteration of pseudo-random number 769B once for every $2^N$ cycles of clock signal 764B. The output signal of N-input AND gate may have an active edge only once every $2^N$ cycles of clock signal 764B, causing LFSR 761B to generate the same pseudo-random number 769B for $2^N$ cycles of clock signal 764B.

Similarly, the rotation structure shown in FIG. 7C uses an AND gate to inhibit or stall every $2^N-1$ cycles when the all-one state is detected. LFSR 760C may generate a new iteration of pseudo-random number 768C for every cycle of clock signal 764C, and LFSR 761C may generate a new iteration of pseudo-random number 769C for every cycle of clock signal 764C, except when inhibit signal 766C is active. Inhibit signal 766C of N-input AND gate may have an active edge only once every $2^N$ cycles of clock signal 764C, causing LFSR 761C to generate the new iterations of pseudo-random number 769C for every cycle of clock signal 764C except for once per every $2^N$ cycles of clock signal 764C.

These units are used as pseudo-random number generator 160 in FIG. 1B or number source 300 in the stochastic stream generator shown in FIG. 3. The unary stream-based prior deterministic approaches shown in Table 2 above include optimized and implemented counter-based architectures. The conventional random stream-based implementations include two different 8-bit or two different 16-bit LFSRs as the sources of random numbers. The designs were synthesized using the Synopsys Design Compiler vH2013.12 with a 45 nm gate library.

As shown in Table 2, the hardware area cost of the proposed deterministic designs is slightly (<10%) more than that of their corresponding prior deterministic implementations. Due to replacing counters with LFSRs in the proposed architectures, the power consumption has also increased in all cases. An important metric, however, in evaluating the efficiency of the implemented designs is energy consumption, defined as the product of the power consumption and processing time.

Table 2 evaluates the energy-efficiency of the different designs by measuring the energy consumption of each one in achieving a specific accuracy in processing the inputs. MAE is used as the accuracy metric (a lower MAE means a higher accuracy). To comprehensively test the designs, the operation of the Robert's cross circuit was simulated in each design approach by processing 10,000 sets of 8-bit precision random input values. For accurate representation of input values in each design approach, an integer value between zero and the period of the (pseudo-random) number generator was randomly chosen and divided by the period.

Figure 8:
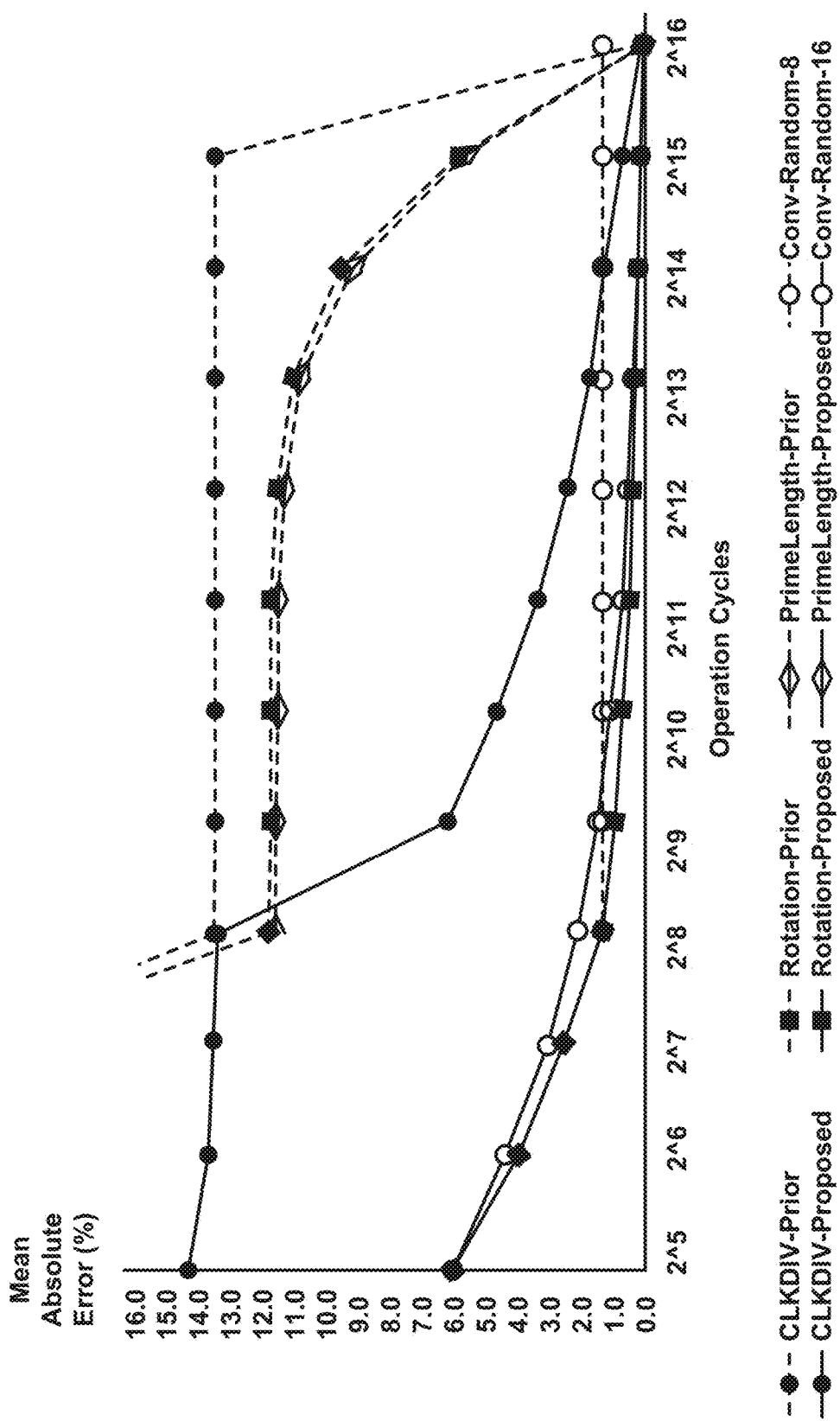
FIGS. 8 and 9 are graphs illustrating the mean absolute error (%) and standard deviation of the absolute error when processing random input values with the Robert's cross stochastic circuit using different stochastic approaches.
Figure 9:
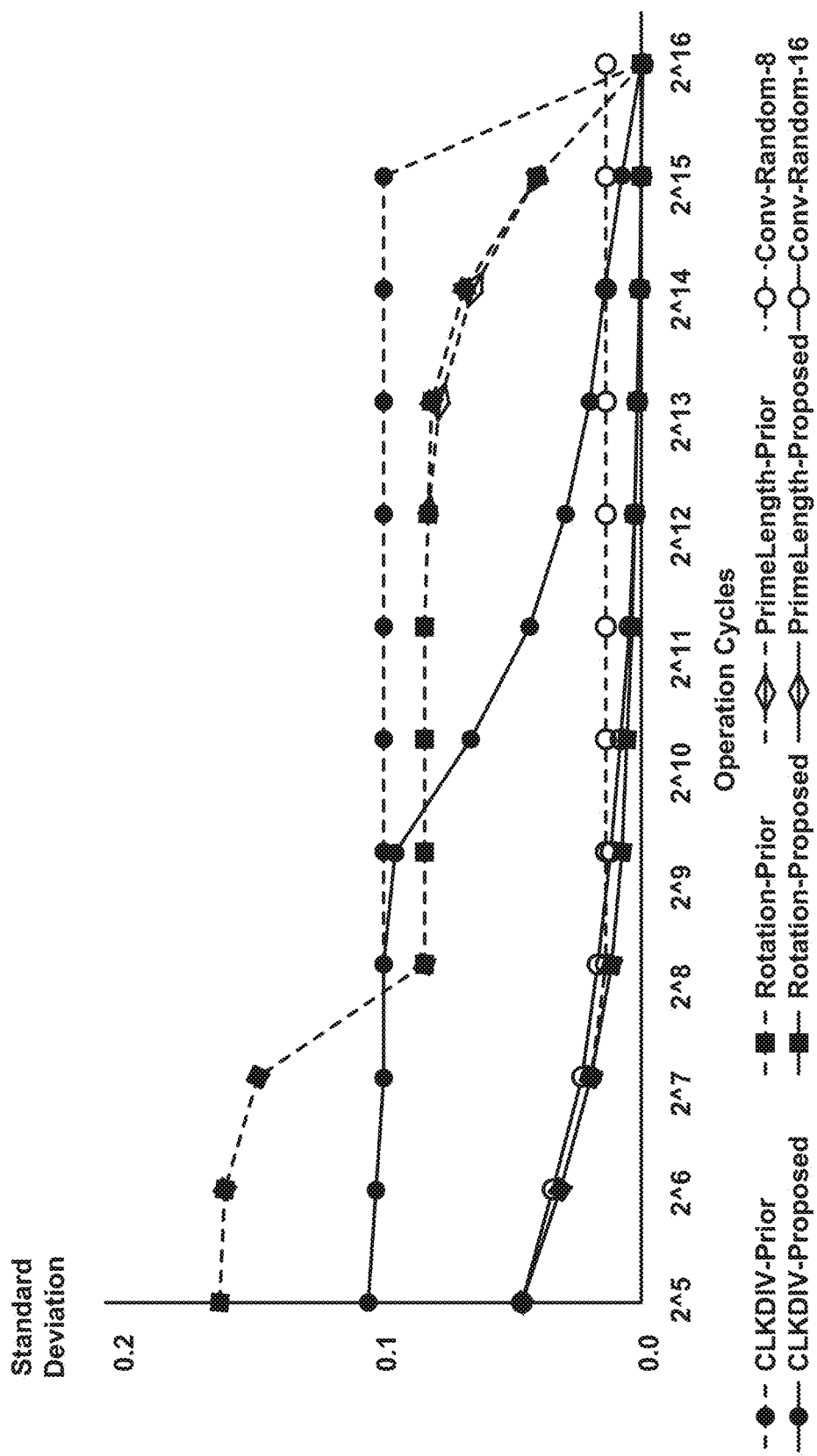

FIGS. 8 and 9 illustrates the mean absolute error (%) and standard deviation of the absolute error when processing random input values with the Robert's cross stochastic circuit using different stochastic approaches. Table 2 further shows the number of processing cycles and the energy consumption of each design to achieve different accuracies. When completely accurate results are expected, the proposed designs must run for the same number of cycles as required by the prior deterministic designs (i.e., product of the periods of the number generators). Considering the higher power consumption of the proposed designs, the prior unary-stream based deterministic implementations consume less energy to achieve completely accurate results. A great advantage of the proposed architectures starts when slight inaccuracy in the computation is acceptable. In such cases, the proposed designs start showing a much lower energy consumption by converging to the expected accuracy in a much shorter time.

For the relatively prime and the rotation approaches, the proposed designs improve the processing time by 61% and 55%, respectively, resulting in an energy consumption savings of 41% and 33% when accepting an MAE of as low as 0.1%. For an MAE of 3.0%, these architectures consume 324 and 334 times lower energy by improving the processing time by up to 500× compared to prior unary-stream based architectures. For the clock division approach, the proposed design is more energy efficient if at least an MAE of 1.0% is acceptable. The energy consumption is reduced 10 times for this method for an MAE of 3%.

Compared to the conventional random stream-based architectures (Cony-Random-8 with 8-bit LFSRs and Conv-Random-16 with 16-bit LFSRs in Table 2) the proposed structures are more energy-efficient than the 16-bit conventional architecture but are at the same level with the 8-bit implementation. An important point, however, is that the 8-bit conventional architecture cannot achieve an MAE of 1.0% or lower, and the 16-bit architecture requires a very long processing time and consumes significant energy to get close to completely accurate results.

Figure 10:
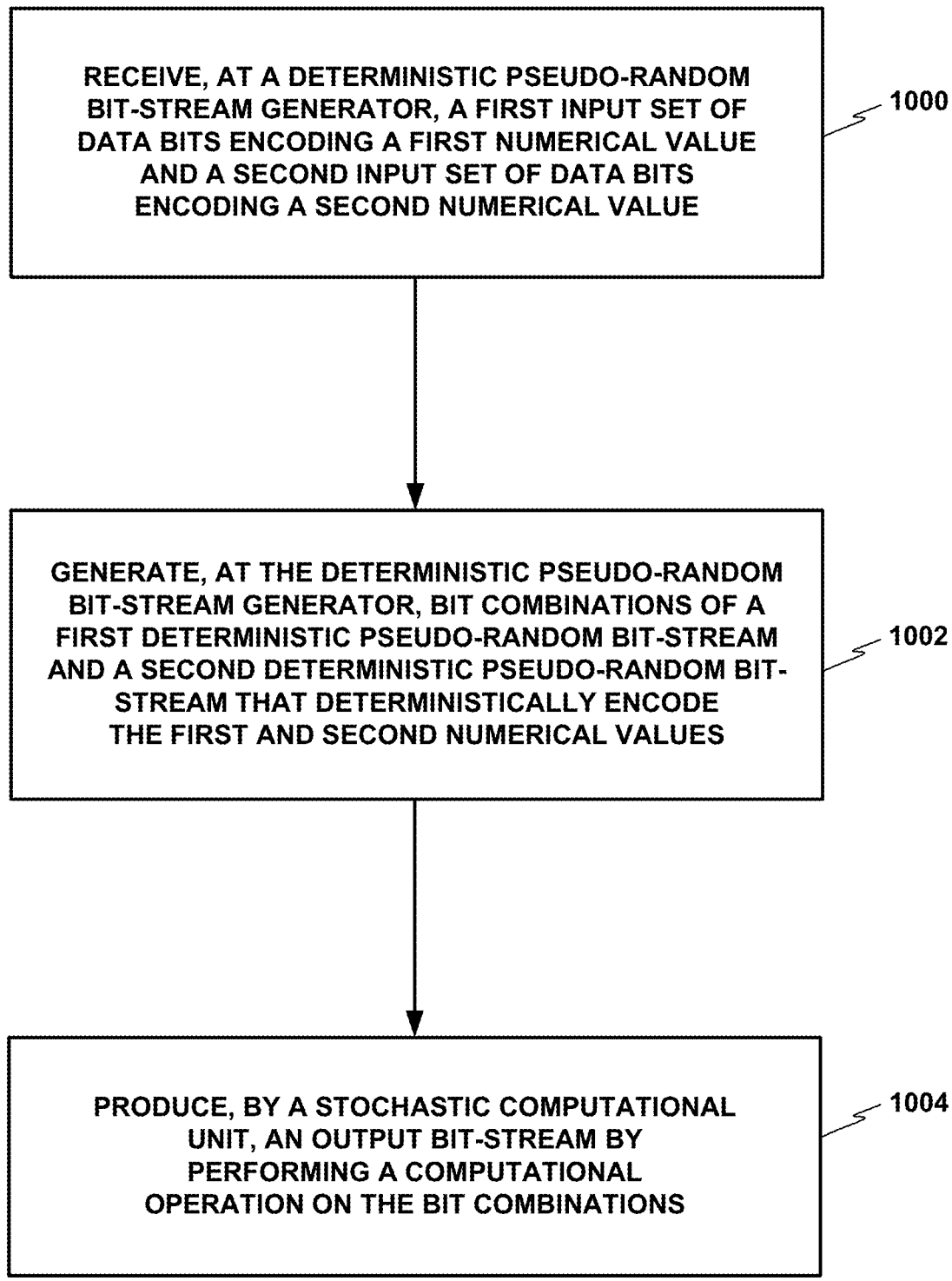
FIG. 10 is a flow diagram illustrating example techniques for performing a digital computational operation.

FIG. 10 is a flow diagram illustrating example techniques for performing a digital computational operation. The example techniques of FIG. 10 are described with reference to computational unit 100 and deterministic pseudo-random bit-stream generators 122 and 124 of FIGS. 1A and 1B, but other components such as number source 300 of FIG. 3, the computational units of FIGS. 4A-4D, and the LFSRs of FIGS. 7A-7C, may also perform similar techniques.

In the example of FIG. 10, deterministic pseudo-random bit-stream generator 120 receives input set of data bits 110 encoding a first numerical value and input set of data bits 112 encoding a second numerical value (1000). Input sets 110 and 112 encode numerical values through binary encoding, unary encoding, and/or any other type of encoding. Generator 120 may receive input sets 110 and 112 as parallel data bits, serial data bits, and/or a combination of parallel and serial data bits.

Comparator 190 of deterministic pseudo-random bit-stream generator 120 generates bit combinations 134 of operand bit-stream 130 encoding the first numerical value and operand bit-stream 132 encoding the second numerical value (1002). Operand bit-streams 130 and 132 may include a serial stream of ones and zeroes, where each operand bit-stream is a version (e.g., unaltered, stalled, shifted, inhibited, rotated, repeated) of a respective deterministic pseudo-random bit-stream that encodes a numerical value based on a probability that any data bit is high. Bit-stream 130 represents a first bit sequence, and bit-stream 132 represents a second bit sequence. In some examples, bit-stream 130 includes a repeated, clock divided, rotated, or stalled version of the first bit sequence.

Stochastic computational unit 140 generates output bit-stream 150 by performing a computational operation on bit combinations 134, wherein the data bits of output bit-stream 150 represent a result of the computational operation based on a probability that any data bit in output bit-stream 150 is high (1008). Stochastic computational unit 140 may be configured to operate on bit combinations that include one bit from operand bit-stream 130 and another bit from operand bit-stream 132. Output bit-stream 150 may encode the result with greater accuracy, as compared to a computational operation on stochastic bit-streams or other types of deterministic bit-streams.

Recent work on SC has shown that computation using stochastic logic can be performed deterministically and accurately by properly structuring unary-style bit-streams. The hardware cost and the latency of operations are much lower than those of the conventional random SC when completely accurate results are expected. For applications in which slight inaccuracy is acceptable, however, these unary stream-based deterministic approaches must run for a relatively long time to produce acceptable results. This processing time, which is often much longer than the latency of the conventional random SC in achieving the same accuracy levels, makes the deterministic approaches energy inefficient.

While randomness was a source of inaccuracy in the conventional random stream-based SC, pseudo-randomness may be used in improving the progressive precision property of the deterministic approaches to SC. Completely accurate results are still produced if running the operation for the required number of cycles. When slight inaccuracy is acceptable, however, a significant improvement in the processing time and energy consumption occurs compared to the prior unary stream-based deterministic approaches and also compared to the conventional random-stream based approaches. The proposed approach is applicable to any operation covered by the deterministic approaches of SC.

This disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A programmer, such as patient programmer or clinician programmer, or other computing device may also contain a more portable removable memory type to enable easy data transfer or offline data analysis.

The techniques described in this disclosure, including those attributed to computational unit 100, deterministic pseudo-random bit-stream generator 120, 122, and 124, stochastic computation unit 140, number generators 160 and 300, number registers 170 and 310, conversion circuitry 180, comparators 190 and 320, and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components, embodied in programmers, such as physician or patient programmers, stimulators, remote servers, or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. For example, any of the techniques or processes described herein may be performed within one device or at least partially distributed amongst two or more devices, such as between computational unit 100, deterministic pseudo-random bit-stream generator 120, 122, and 124, stochastic computation unit 140, number generators 160 and 300, number registers 170 and 310, conversion circuitry 180, comparators 190 and 320. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of computational unit 100, deterministic pseudo-random bit-stream generator 120, 122, and 124, stochastic computation unit 140, number generators 160 and 300, number registers 170 and 310, conversion circuitry 180, comparators 190 and 320 may be programmed with various forms of software. The one or more processors may be implemented at least in part as, or include, one or more executable applications, application modules, libraries, classes, methods, objects, routines, subroutines, firmware, and/or embedded code, for example.

Various embodiments of the invention have been described. These and other embodiments are within the scope of the following claims.

The invention claimed is:

1. A device comprising:
 an integrated circuit comprising a computational circuit configured to process at least a first set of data bits encoding a first numerical value and a second set of data bits encoding a second numerical value,
 wherein the computational circuit comprises:
   a deterministic pseudo-random bit-stream generator configured to generate bit combinations representing a first bit sequence and a second bit sequence that deterministically encode the first and second numerical values, respectively, based on a proportion of the data bits in the sequence that are high relative to the total data bits in the sequence, wherein a subset of the bit combinations pairs a data bit of the first bit sequence with multiple different data bits of the second bit sequence, and wherein the bit combinations are generated such that high data bits of the first and second bit sequence are pseudo-randomly distributed throughout the first and second bit sequences, and
   a stochastic computational circuit configured to:
     perform a computational operation on the bit combinations; and
     produce an output bit-stream having a set of data bits indicating a result of the computational operation, wherein the data bits of the output bit-stream represent the result based on a probability that any data bit in the set of data bits of the output bit-stream is high.

2. The device of claim 1, wherein, prior to performing the computational operation on the bit combinations, the stochastic computational circuit is configured to down sample the first bit sequence and the second bit sequence represented by the bit combinations generated by the deterministic pseudo-random bit-stream generator.

3. The device of claim 1,
 wherein the high data bits are pseudo-randomly distributed throughout the first bit sequence based on a first function comparing two or more data bits of the first bit sequence to generate a next bit of the first bit sequence, and
 wherein the high data bits are pseudo-randomly distributed throughout the second bit sequence based on a second function comparing two or more data bits of the second bit sequence to generate a next bit of the second bit sequence, the second function being different from the first function.

4. The device of claim 1,
 wherein the high data bits are pseudo-randomly distributed throughout the first bit sequence based on a first function and based on a first seed, and
 wherein the high data bits are pseudo-randomly distributed throughout the second bit sequence based on a second function based on a second seed, wherein:
 the second seed is different from the first seed; or
 the second function is different from the first function.

5. The device of claim 1, wherein the deterministic pseudo-random bit-stream generator comprises:
 a first pseudo-random number generator configured to generate a first pseudo-random number;
 a second pseudo-random number generator configured to generate a second pseudo-random number;
 a first comparator configured to generate the first bit sequence based on the first pseudo-random number and a first constant number; and
 a second comparator configured to generate the second bit sequence based on the second pseudo-random number and a second constant number.

6. The device of claim 5,
 wherein each of the first pseudo-random number, the second pseudo-random number, the first constant number, and the second constant number comprises an N-bit binary number, and
 wherein each of the first comparator and the second comparator comprises an N-bit comparator configured to generate the respective bit sequence based on whether the respective pseudo-random number is greater than the respective constant number.

7. The device of claim 5,
wherein the first pseudo-random number generator comprises a first linear-feedback shift register (LFSR) configured to generate the first pseudo-random number based on a first function, and
wherein the second pseudo-random number generator comprises a second LFSR configured to generate the second pseudo-random number based on a second function that is different from the first function.

8. The device of claim 5,
wherein the first pseudo-random number generator comprises a first linear-feedback shift register (LFSR) is configured to receive a clock signal and generate new pseudo-random numbers based on the clock signal, and
wherein the second pseudo-random number generator comprises a second LFSR configured to receive the clock signal and generate new pseudo-random numbers based on the clock signal.

9. The device of claim 8, wherein the second LFSR is configured to receive a reset signal and restart the pseudo-random numbers based on the reset signal.

10. The device of claim 5,
wherein the first pseudo-random number generator comprises a first linear-feedback shift register (LFSR) comprising an N-bit LFSR,
wherein the first LFSR is configured to receive a first clock signal and generate new pseudo-random numbers based on the first clock signal, and
wherein the second pseudo-random number generator comprises a second LFSR configured to:
receive a second clock signal including no more than one active edge per N active edges of the first clock signal; and
generate new pseudo-random numbers based on the active edge of the second clock signal.

11. The device of claim 5,
wherein the first pseudo-random number generator comprises a first linear-feedback shift register (LFSR) configured to receive a clock signal and generate new pseudo-random numbers based on the clock signal, and
wherein the second pseudo-random number generator comprises a second LFSR configured to:
receive the clock signal;
receive an inhibit signal; and
generate new pseudo-random numbers based on the clock signal and the inhibit signal.

12. The device of claim 1,
wherein the first set of data bits encodes the first numerical value in N data bits, and
wherein a length of the first bit sequence is greater than or equal to N data bits.

13. The device of claim 12, wherein a length of the output bit-stream is less than $2^{(2N)}$ data bits.

14. A method for performing a digital computational operation, the method comprising:
receiving, at a deterministic pseudo-random bit-stream generator, a first set of data bits encoding a first numerical value and a second set of data bits encoding a second numerical value;
generating, at the deterministic pseudo-random bit-stream generator, bit combinations representing a first bit sequence and a second bit sequence that deterministically encode the first and second numerical values, respectively, based on a proportion of the data bits in the sequence that are high relative to the total data bits in the sequence, wherein a subset of the bit combinations pairs a data bit of the first bit sequence with multiple different data bits of the second bit sequence, and wherein the bit combinations are generated such that high data bits of the first and second bit sequence are pseudo-randomly distributed throughout the first and second bit sequences; and
producing, by a stochastic computational circuit, an output bit-stream by performing a computational operation on the bit combinations, wherein the data bits of the output bit-stream represent a result of the computational operation based on a probability that any data bit in the output bit-stream is high.

15. The method of claim 14, further comprising down sampling, by the stochastic computational circuit and prior to performing the computational operation on the bit combinations, the first bit sequence and the second bit sequence represented by the bit combinations generated by the deterministic pseudo-random bit-stream generator.

16. The method of claim 14, wherein generating the bit combinations comprises:
generating the first bit sequence such that the high data bits are pseudo-randomly distributed throughout the first bit sequence based on a first function and based on a first seed; and
generating the second bit sequence such that the high data bits are pseudo-randomly distributed throughout the second bit sequence based on a second function and based on a second seed, wherein:
the second seed is different from the first seed; or
the second function is different from the first function.

17. The method of claim 14, further comprising:
generating a first pseudo-random number and a second pseudo-random number;
generating the first bit sequence based on the first pseudo-random number and a first constant number; and
generating the second bit sequence based on the second pseudo-random number and a second constant number.

18. A device configured to process a first set of data bits encoding a first numerical value and a second set of data bits encoding a second numerical value, the device comprising:
a first pseudo-random number generator configured to:
receive a clock signal; and
generate a first series of pseudo-random numbers based on the clock signal;
a second pseudo-random number generator configured to:
receive the clock signal;
receive a reset signal;
generate a second series of pseudo-random numbers based on the clock signal; and
restart the second series of pseudo-random numbers based on the reset signal;
a first comparator configured to generate a first bit sequence based on the first series of pseudo-random numbers and a first constant number;
a second comparator configured to generate a second bit sequence based on the second series of pseudo-random numbers and a second constant number; and
a stochastic computational circuit configured to:
perform a computational operation on the first bit sequence and the second bit sequence; and
produce an output bit-stream having a set of data bits indicating a result of the computational operation, wherein the data bits of the output bit-stream represent the result based on a probability that any data bit in the set of data bits of the output bit-stream is high.

19. A device configured to process a first set of data bits encoding a first numerical value and a second set of data bits encoding a second numerical value, the device comprising:
- a first pseudo-random number generator configured to:
  - receive a clock signal; and
  - generate a first series of pseudo-random numbers based on the clock signal;
- a second pseudo-random number generator configured to:
  - receive the clock signal;
  - receive an inhibit signal; and
  - generate a second series of pseudo-random numbers based on the clock signal and the inhibit signal;
- a first comparator configured to generate a first bit sequence based on the first series of pseudo-random numbers and a first constant number;
- a second comparator configured to generate a second bit sequence based on the second series of pseudo-random numbers and a second constant number; and
- a stochastic computational unit configured to:
  - perform a computational operation on the first bit sequence and the second bit sequence; and
  - produce an output bit-stream having a set of data bits indicating a result of the computational operation, wherein the data bits of the output bit-stream represent the result based on a probability that any data bit in the set of data bits of the output bit-stream is high.

20. The device of claim 19, further comprising a logic gate configured to:
- receive each number of the first series of pseudo-random numbers; and
- generate the inhibit signal based on the first series of pseudo-random numbers.

\* \* \* \* \*